United States Patent
Jocha et al.

(10) Patent No.: US 9,306,819 B2
(45) Date of Patent: *Apr. 5, 2016

(54) CONTROLLER DRIVEN OAM FOR SPLIT ARCHITECTURE NETWORK

(71) Applicant: Telefonaktiebolaget L M Ericsson (publ), Stockholm (SE)

(72) Inventors: David Jocha, Budapest (HU); Andras Kern, Budapest (HU)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 14/798,310

(22) Filed: Jul. 13, 2015

(65) Prior Publication Data

US 2015/0319057 A1    Nov. 5, 2015

Related U.S. Application Data

(63) Continuation of application No. 14/569,488, filed on Dec. 12, 2014, now Pat. No. 9,112,774, which is a continuation of application No. 13/279,018, filed on Oct. 21, 2011, now Pat. No. 8,964,563.

(60) Provisional application No. 61/505,617, filed on Jul. 8, 2011.

(51) Int. Cl.
*H04L 12/26* (2006.01)
*H04L 12/24* (2006.01)

(52) U.S. Cl.
CPC ............ *H04L 43/062* (2013.01); *H04L 41/046* (2013.01); *H04L 43/026* (2013.01); *H04L 43/08* (2013.01)

(58) Field of Classification Search
None
See application file for complete search history.

(56) References Cited

U.S. PATENT DOCUMENTS

| | | |
|---|---|---|
| 8,477,614 B2 | 7/2013 | Wiley et al. |
| 2008/0101241 A1 | 5/2008 | Mohan et al. |
| 2011/0188373 A1 | 8/2011 | Saito |
| 2011/0231545 A1 | 9/2011 | Enomoto et al. |
| 2011/0273988 A1 | 11/2011 | Tourrilhes et al. |
| 2011/0286324 A1 | 11/2011 | Bellagamba et al. |
| 2013/0007252 A1 | 1/2013 | Welin et al. |

FOREIGN PATENT DOCUMENTS

WO    WO-2010/064532 A1    6/2010

OTHER PUBLICATIONS

U.S. Appl. No. 13/275,149, Non-Final Office Action, mailed Dec. 5, 2013, 9 pages.
U.S. Appl. No. 13/275,149, Final Office Action, mailed May 19, 2014, 10 pages.

(Continued)

*Primary Examiner* — Robert M Morlan
(74) *Attorney, Agent, or Firm* — Nicholson, De Vos, Webster & Elliot, LLP

(57) ABSTRACT

A method is performed by a network element implementing a controller of a split architecture network. The method requests that a subset of switches in the network report metrics for a data flow to provide a management module with information for executing a management function. A second method is performed by a network element implementing a switch. The switch reports metrics for a data flow to the controller, wherein the switch forwards a management packet with the data flow and collects the metrics for the data flow.

14 Claims, 12 Drawing Sheets

(56) References Cited

OTHER PUBLICATIONS

U.S. Appl. No. 13/275,149, Notice of Allowance, mailed Nov. 25, 2014, 13 pages.
U.S. Appl. No. 13/279,018, Non-Final Office Action, mailed Sep. 26, 2013, 15 pages.
U.S. Appl. No. 13/279,018, Final Office Action, mailed Mar. 5, 2014, 17 pages.
U.S. Appl. No. 13/279,018, Non-Final Office Action, mailed Jun. 18, 2014, 21 pages.
U.S. Appl. No. 13/279,018, Notice of Allowance, mailed Oct. 17, 2014, 6 pages.
U.S. Appl. No. 14/569,488, Non-Final Office Action, mailed Jan. 27, 2015, 22 pages.
U.S. Appl. No. 14/569,488, Notice of Allowance, mailed Apr. 13, 2015, 9 pages.
IEEE 802.1ag: "Virtual Bridged Local Area Networks—Amendment 5: Connectivity Fault Management", IEEE 802.1ag, Standard for Local and Metropolitan Area Networks, Dec. 17, 2007, 260 pages.
IEEE 1588-2002: "Standard for a Precision Clock Synchronization Protocol for Networked Measurement and Control Systems", IEEE Instrumentation and Measurement Society, Nov. 8, 2002, 154 pages.
ITU-T Y.1731: "OAM functions and mechanisms for Ethernet based networks", ITU-T Y.1731, Series Y: Global Information Infrastructure, Internet Protocol Aspects and Next Generation Networks, Internet protocol aspects—Operation, administration and maintenance, Feb. 2008, 82 pages.
"Open Flow Switch Specification" version 1.1.0 Implemented (Wire Protocol 0x02), http://archive.openflow.org/documents/openflow-spec-v1.1.0.pdf, Feb. 28, 2011, 56 pages.
Allan, et al., "Proactive Connectivity Verification, Continuity Check and Remote Defect indication for MPLS Transport Profile", MPLS Working Group, Internet Draft, IETF, draft-ietf-mpls-tp-cc-cv-rdi-05, Jun. 2011, 22 pages.
Busi, et. al., "MPLS-TP OAM based on Y.1731", MPLS Working Group, Internet Draft, ITEF, draft-bhh-mpls-tp-oam-y1731-06.txt, Oct. 25, 2010, 29 pages.
Busi, et al., "Operations, Administration and Maintenance Framework for MPLS-based Transport Networks", MPLS Working Group, Internet Draft, ITU-T, ITEF, http://tools.ietf.org/html/draft-ietf-mpls-tp-oam-framework-11, Feb. 2011, 65 pages.
RFC 5860: Vigoureux, et al., "Requirements for Operations, Administration, and Maintenance (OAM) in MPLS Transport Networks", IETF Request for Comments (RFC) 5860, May 2010, 17 pages.

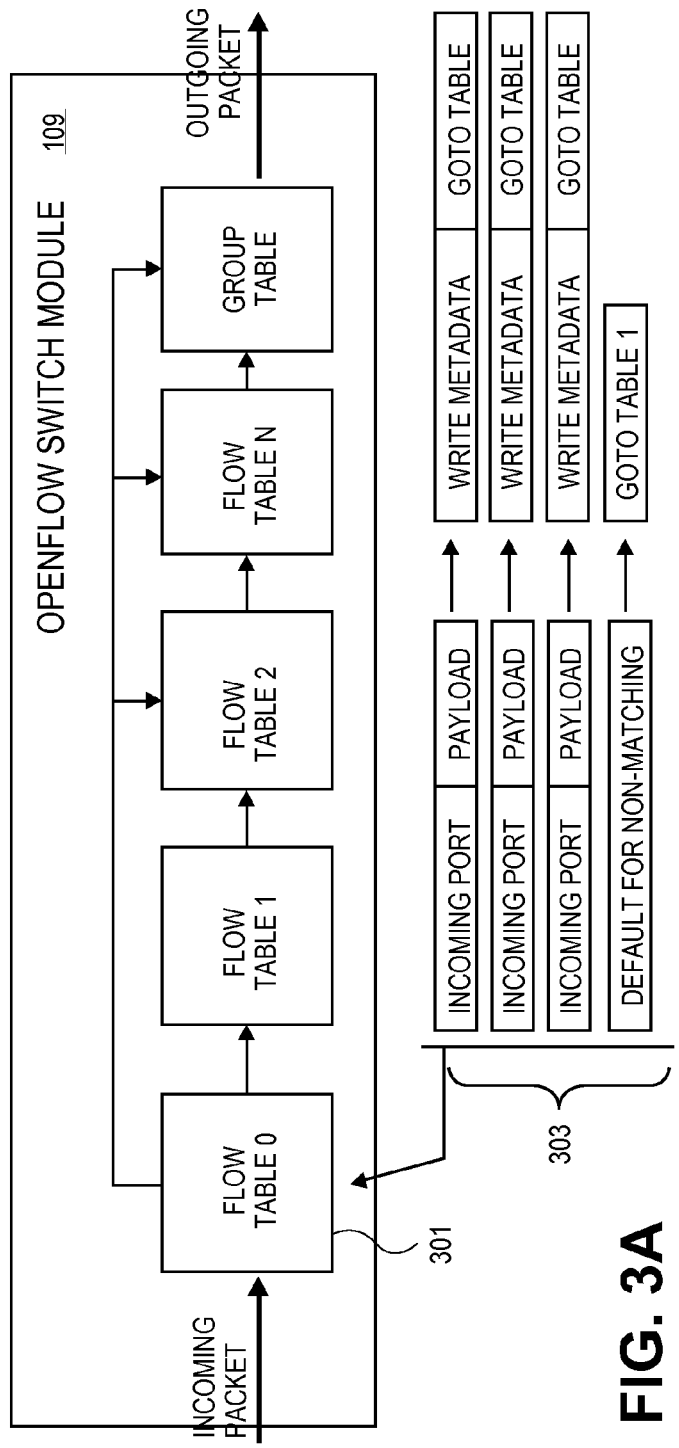
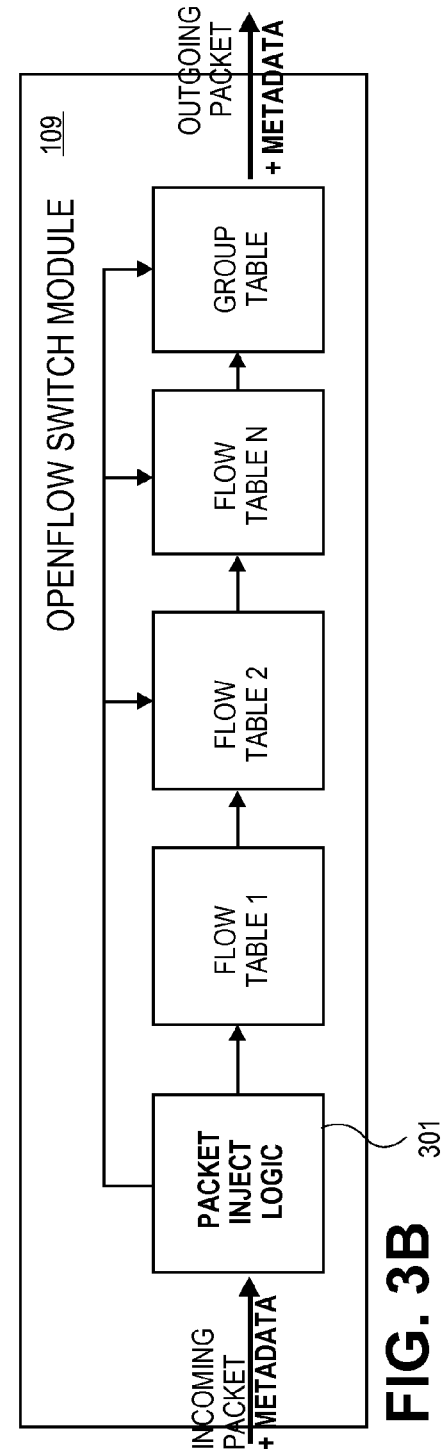
FIG. 3A
FIG. 3B

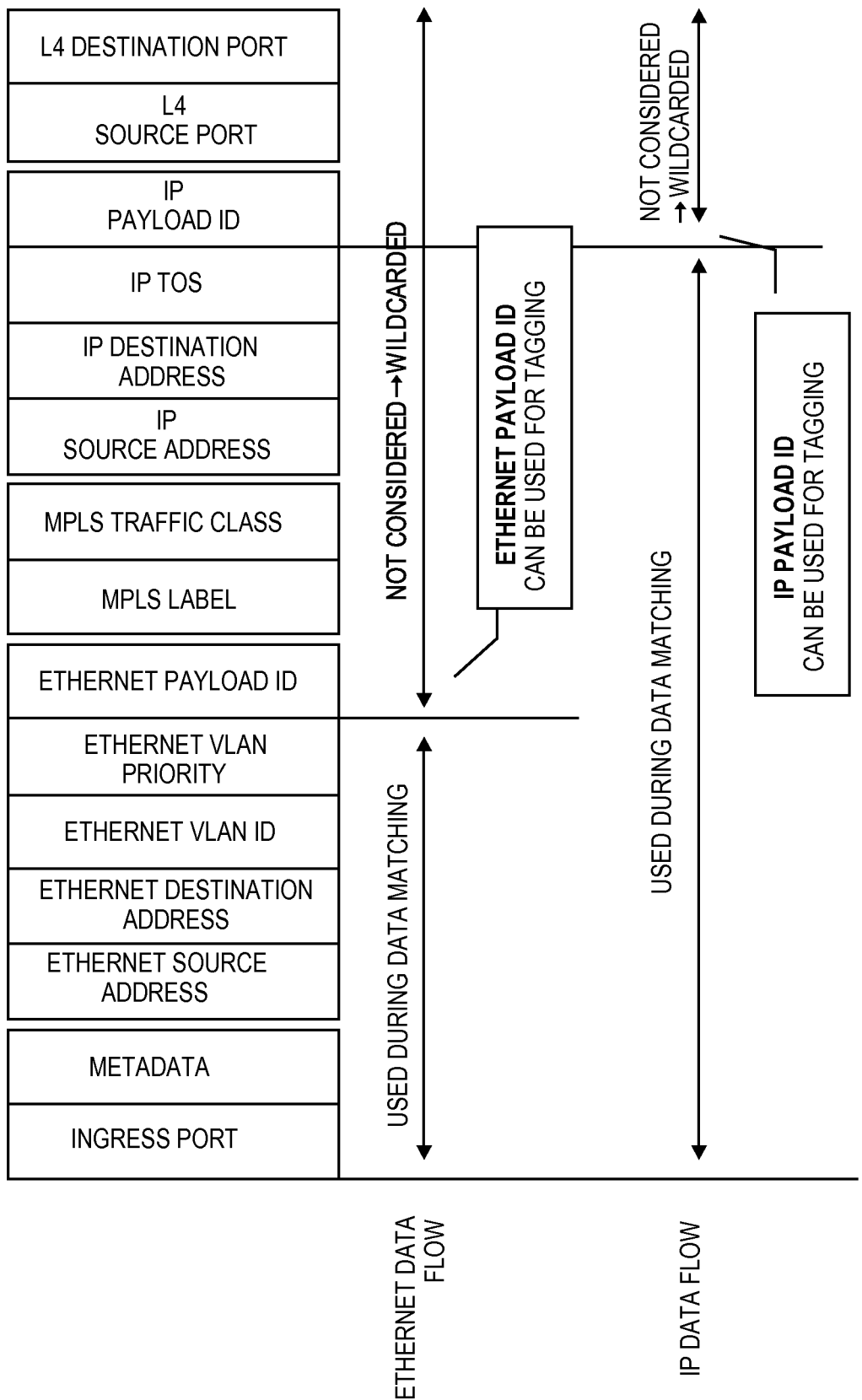

| VERSION | TYPE | LENGTH (16bits) |
|---|---|---|
| XID (32bits) | | |
| Incoming port ID (32bits) | | |
| Table Index (32bits) | | |
| Group Entry Id (32bits) | | |
| Meta-data (64bits) | | |
| Packet to be injected (LENGTH - 24 octets) | | |

FIG. 5

| TYPE (16bits) | LENGTH = 20 (16bits) |
|---|---|
| Table Index (32bits) | |
| Group Entry Id (32bits) | |
| Meta-data (64bits) | |

FIG. 6

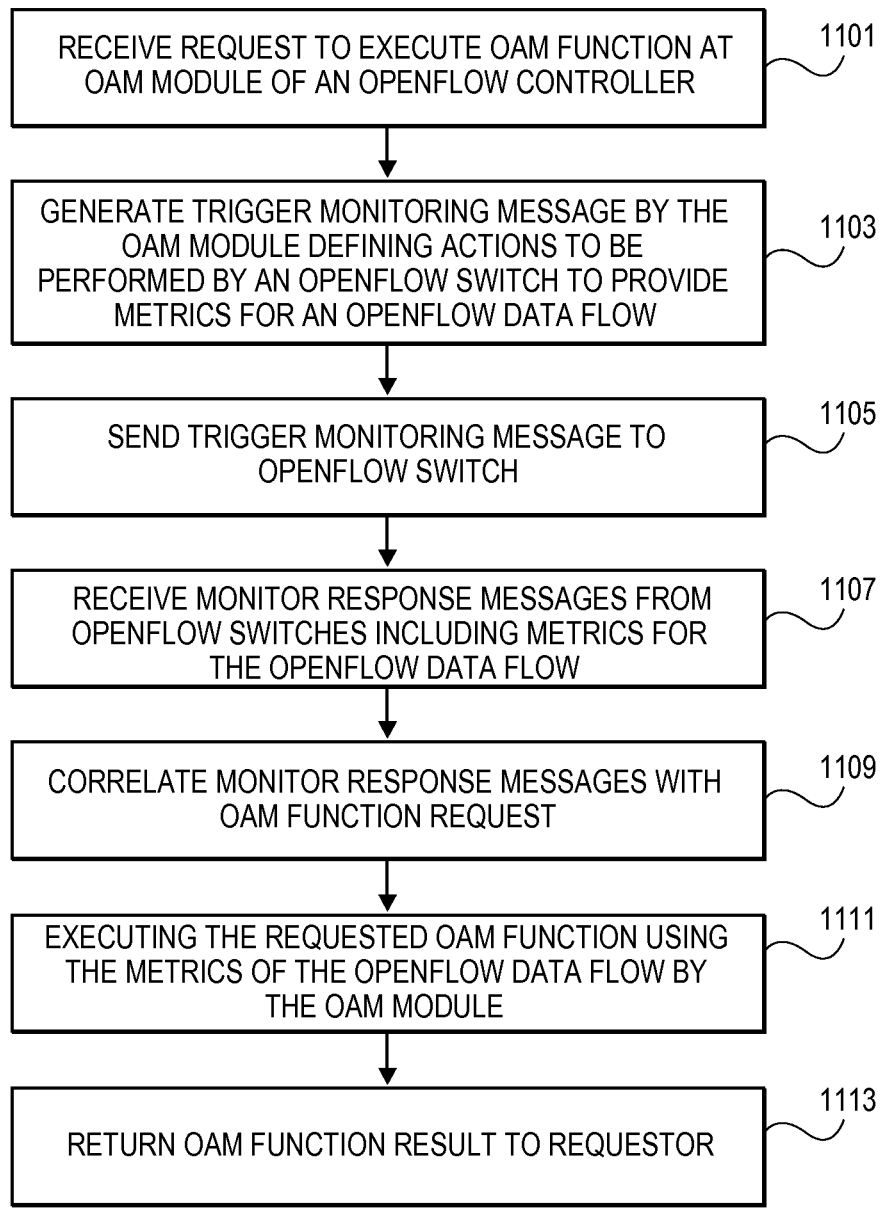

CONTROLLER DRIVEN OAM FOR SPLIT ARCHITECTURE NETWORK

CROSS-REFERENCE TO RELATED APPLICATION

The present application is a continuation of U.S. patent application Ser. No. 14/569,488 filed Dec. 12, 2014, which is a continuation of U.S. patent application Ser. No. 13/279,018 filed Oct. 21, 2011 (now U.S. Pat. No. 8,964,563 issued Feb. 24, 2015), which claims priority from U.S. Provisional Patent Application No. 61/505,617 filed Jul. 8, 2011.

FIELD OF THE INVENTION

The embodiments of the invention are related to the implementation of operations, administration and management (OAM) functions for a split architecture network. Specifically, the embodiments of the invention relate to a method and system for initiating data flow monitoring and metric collection to service OAM functions at the controller of the split architecture network.

BACKGROUND

Unlike the traditional network architecture, which integrates both the forwarding (data) and the control planes in the same box (network element); a split architecture network decouples these two planes and executes the control plane on servers that might be in different physical locations from the forwarding elements (switches). The use of a split architecture in a network enables the simplification of the switches implementing the forwarding plane and shifts the intelligence of the network into a number of controllers that oversee the switches.

The tight coupling of the forwarding and control planes in a traditional architecture usually results in an overly complicated control plane and complex network management. This is known to create a large burden and high barrier to new protocols and technology developments. Despite the rapid improvement of line speeds, port densities, and performance, the network control plane mechanisms have advanced at a much slower pace than the forwarding plane mechanisms.

In a split architecture network, controllers collect information from switches, and compute and distribute the appropriate forwarding decisions to switches. Controllers and switches use a protocol to communicate and exchange information. An example of such protocol is OpenFlow (see www.openflow.org), which provides an open and standard method for a switch to communicate with a controller, and it has drawn significant interest from both academics and industry.

SUMMARY

In one embodiment, a method is performed by a network element implementing a controller for a split architecture network. The method requests that a subset of switches in the network report metrics for a data flow to provide a management module with information for executing a management function. The method includes generating a trigger monitoring message by a management module. The trigger monitoring message defines actions to be performed by a switch in the subset of switches, where the actions are to provide the metrics for the data flow. The trigger monitoring message is sent to the switch, and a plurality of monitor response messages are received from the subset of switches, each of the plurality of monitor response messages including a metric entry for each flow table or group table in which a match for the data flow occurred in a given switch, where each metric entry includes any one of a flow table identifier, a group identifier, a match structure, or a cookie of a flow entry. The plurality of monitor response messages are correlated with the management function. The management function is executed using the metrics of the data flow by the management module, and a result of the management function is generated.

A method is performed by a network element implementing a switch. The switch is configured to report metrics for a data flow to a controller of a split architecture network. The switch forwards a management packet with the data flow and collects the metrics for the data flow. The method includes the switch receiving a trigger monitoring message from the controller. The management packet is generated by a protocol agent, where the management packet is defined by the trigger monitoring message. The management packet is forwarded through the switch module to aggregate the management packet with the data flow. The management packet is detected in the switch module. A monitoring response message is generated by the protocol agent in response to the detecting of the management packet. The metrics are collected from the switch module for the data flow and management packet, and the monitor response message is sent with the metrics to the controller, where the monitor response message includes a metric entry for each flow table or group table in which a match for the management packet occurred in the switch module, and where each metric entry includes any one of a flow table identifier, a group identifier, a match structure, or a cookie of a flow entry.

A network element implements a controller, where the controller services a management function request in a network having a split architecture. The controller requests that a subset of switches in the network report metrics for a data flow to provide the information for executing the requested management function. The network element includes a processor coupled to a management module and a message correlation module. The processor is configured to execute the management module. The management module is configured to generate a trigger monitoring message. The trigger monitoring message defines actions to be performed by a switch in the subset of flow switches, where the actions are to provide the metrics for the data flow. The processor is further configured to execute the management module to send the trigger monitoring message to the switch, to execute the management function using the metrics of the data flow provided by the message correlation module, and to generate a result of the management function. The message correlation module is communicatively coupled to management module. The processor is further configured to execute the message correlation module to receive a plurality of monitor response messages from the subset of switches. Each of the plurality of monitor response messages including a metric entry for each flow table or group table in which a match for the data flow occurred in a given switch, where each metric entry includes any one of a flow table identifier, a group identifier, a match structure, or a cookie of a flow entry. The processor is further configured to execute the message correlation module to correlate the plurality of monitor response messages with the management function request.

BRIEF DESCRIPTION OF THE DRAWINGS

The present invention is illustrated by way of example, and not by way of limitation, in the figures of the accompanying drawings in which like references indicate similar elements.

It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 3A is a diagram of a first embodiment of an OpenFlow switch module.

FIG. 3B is a diagram of a second embodiment of an OpenFlow switch module.

FIG. 4 is a diagram of a Openflow matching structure.

FIG. 5 is a diagram of one embodiment of a controller to switch OpenFlow message format FIG. 6 is a diagram of one embodiment of an injection action format.

FIG. 10 is a diagram of an example embodiment of trigger monitoring message.

FIG. 11 is a flowchart of one embodiment of a process for OAM function request processing.

DETAILED DESCRIPTION

Figure 1:
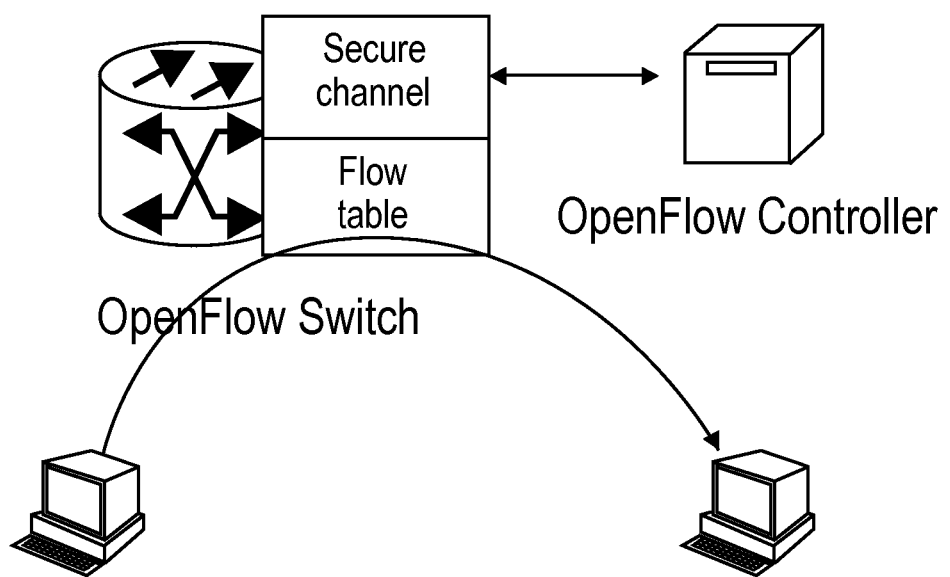
FIG. 1 is a diagram of one embodiment of an example architecture for a simple OpenFlow network.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The techniques shown in the figures can be implemented using code and data stored and executed on one or more electronic devices (e.g., an end station, a network element, server or similar electronic devices). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, or similar networking device.) is a piece of networking equipment, including hardware and software that communicatively interconnects other equipment on the network (e.g., other network elements, end stations, or similar networking devices). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data collection).

In the following description and claims, the terms 'coupled' and 'connected,' along with their derivatives, may be used. It should be understood that these terms are not intended as synonyms for each other. 'Coupled' is used to indicate that two or more elements, which may or may not be in direct physical or electrical contact with each other, co-operate or interact with each other. 'Connected' is used to indicate the establishment of communication between two or more elements that are coupled with each other.

The embodiments of the invention provide a method and system for avoiding the disadvantages of the prior art. Most data plane technologies, such as Ethernet or multi-protocol label switching (MPLS), used in combination with OpenFlow have defined OAM solutions that are specific to these technologies. The OAM solutions defined by these data plane technologies provide a mechanism to identify, inject, and de-multiplex the OAM packets into/from a data flow. Also these OAM solutions ensure correct fate sharing for OAM packets where the OAM packets are forwarded in the same manner that the service packets are forwarded through a network. However, OpenFlow does not provide support for any mechanism that enables OAM packet identification, injecting or de-multiplexing. This makes the implementation of any OAM solution in an OpenFlow domain impossible. Implementing fate sharing for an OAM technology to be used in OpenFlow requires special consideration about the identification of OAM packets that is not supported by the OpenFlow 1.1 specification.

Further, OpenFlow 1.1 does not define any means for configuring an OpenFlow switch to perform OAM functions. There are no established control messages for sending configuration information to the OpenFlow switches or any control messages for activating OAM related functionality at the OpenFlow switches. Similarly, there are no control messages for receiving OAM related data from the OpenFlow switches. The absence of any OAM support in OpenFlow requires the network elements implementing the OpenFlow switches to fully implement the OAM functionality of the other data plane technologies such as Ethernet and MPLS, which increases the cost of the network element.

The embodiments of the invention overcome these disadvantages of the prior art. The embodiments of the invention. The embodiments of the invention provide a process and systems for enabling OAM packets (i.e., tagged frames) to be inserted into an OpenFlow data flow, and to be de-multiplexed from the OpenFlow data flow. The process and system support fate sharing for the OpenFlow OAM packets that ensures the OpenFlow OAM packets take the same path through a network between the source and destination of the data flow as the other data packets of the data flow (i.e., data stream). To distinguish the OpenFlow OAM packets (i.e., tagged frames) from other OpenFlow data packets a matching field that is not taken into account during matching for the handling of the OpenFlow data packets is utilized to identify the OAM packets. A non-allocated value of the selected field's domain is used to identify the OAM packets (tagged frames). To insert the OAM packets (tagged frames) into any stage of the packet processing pipeline, a new logical module is added to the OpenFlow switch module. The new logical module is referred to herein as the 'Packet Inject Logic' (PIL). Two example implementation options are described herein. In the first example implementation, the PIL is configured to manage the injection of the OAM packets (tagged frames) on per-packet basis; in the second example embodiment, the PIL receives instructions directing the injection of the OAM packet (tagged frame) from other switch modules of the network element through meta data attached to the OAM packet. In other example embodiments, the de-multiplex process distinguishes between the OpenFlow data packets and the OpenFlow OAM packets (tagged frames) using an in-switch and/or a controller termination option. The OpenFlow protocol is extended in order to support the remote instruction of the PIL related to the identification, injection and de-multiplexing of the OpenFlow OAM packets.

In addition, the embodiments of the invention implement all OAM related intelligence, including processes for initiating monitoring of OpenFlow data flows and the collection of performance measurements at the OpenFlow switch in response to control messages from the OpenFlow controller, collecting the monitoring and measurement results from all the OpenFlow switches in a domain at the OpenFlow controller, processing these results, and initiating subsequent actions based on these results in the centralized OpenFlow controller. The OpenFlow switches implement only basic and generic features to provide sufficient metric information to the OpenFlow controller.

The OpenFlow controller initiates the OpenFlow data flow monitoring by instructing a first OpenFlow switch that the OpenFlow data flow is traversing to send an OAM packet and instructing the first OpenFlow switch to collect data associated with forwarding the OAM packet and the associated OpenFlow data flow. The first OpenFlow switch sends feedback to the OpenFlow controller about the OAM packets generated by the OpenFlow switch in response to the instructions from the OpenFlow controller. The feedback can include which flow or group table entries matched on the OAM packets, the values of counters of the matched entries, the time stamps of the matches or similar information. Any other OpenFlow switch traversed by the OpenFlow data flow can also sends similar feedback to the OpenFlow controller if it is configured in advance to send a feedback to the OpenFlow controller upon receiving an OAM packet.

Using the feedback information provided by the OpenFlow switches related to the monitoring of OAM packets and the associated OpenFlow data flow, the OpenFlow controller can implement standard OAM functions, like connectivity verification (CV), link trace (LT), delay measurement (DM), lost measurement (LM) for any OpenFlow data flow.

OpenFlow Architecture

FIG. 1 is a diagram showing an overview of the OpenFlow interface between a switch and a controller. OpenFlow defines a logical switch model, which includes defining packet forwarding and processing functions of the logical switch making use of a generic table-based model in the form of a flow table to create a packet processing pipeline. The tables defined in this table model comprise rows where each row describes a packet handling alternative with three fields: rules, actions and counters. The rules specify the circumstances under which the actions are to be executed. In each instance where the actions are applied, the corresponding counter is updated.

In the OpenFlow 1.1 specification, two table types, the flow table and the group table, have been defined. In a flow table the rule field contains a vector of attributes from the header. This vector contains variables of the Ethernet, the MPLS, the IP and the TCP/UDP headers. The rule of the group table is an index identifying the action in a list of actions to be executed for the packet. The group table thereby supports complex actions such as multicast and protection.

The packet processing pipeline is formed by a sequence of flow tables followed by one group table. Any packet entering the switch is automatically processed according to the first flow table. As a result of matching the packet in the first flow table, the packet can be updated, sent out through a port or sent for further processing to a subsequent table. Meta data can be assigned to the packet during processing in each flow table and passed to the subsequent tables. If the packet is sent to a subsequent table, it will then be processed according to that flow table. The packet can be processed by each table in the pipeline or can be forwarded to a port or any particular table in the pipeline thereby bypassing processing of intermediate tables.

The final table in the packet processing pipeline is the group table. The group table consists of group entries. The ability for packets in a particular data flow (i.e., a particular flow) to point to a group enables OpenFlow to represent additional methods of forwarding the packets of that flow (e.g., select, all, fast failover, and similar actions). There are Action Buckets associated with a group table entry, where each action bucket contains a set of actions to execute. The group table entry determines which Action Bucket to execute, where the possible actions are similar to those defined in the flow tables.

The de-coupled control platform of the split architecture eases the task of modifying the network control logic and provides a programmatic interface upon which developers can build a wide variety of new protocols and management applications. In this model, the data and control planes can evolve and scale independently, while the cost of the data plane elements is reduced.

Network Element Architecture

Figure 2:
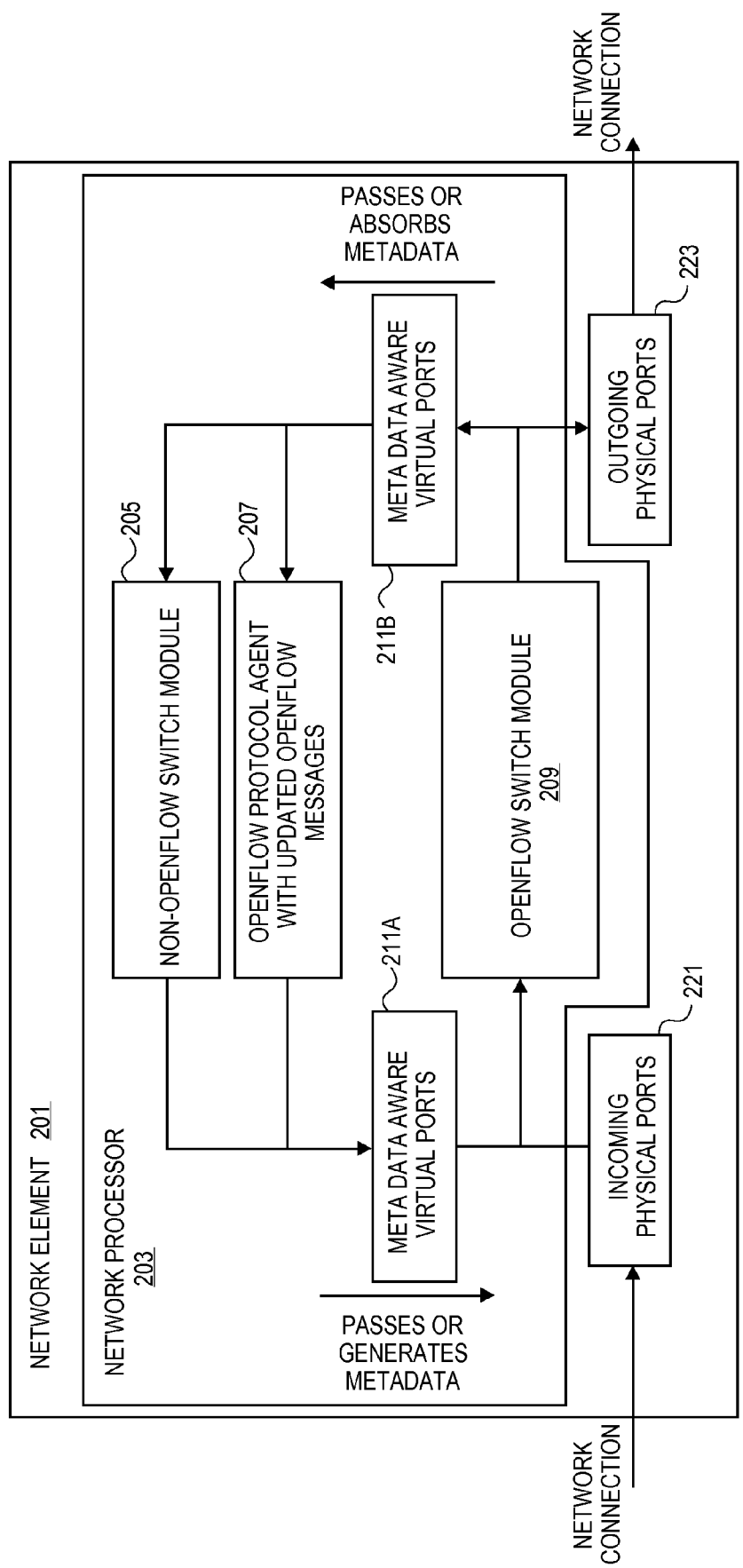
FIG. 2 is a diagram of one embodiment of a network element executing a generic packet monitoring mechanism and process.

The embodiments of the invention are implemented in a network element such as a router or switch in a wide area network, such as the Internet, or similar network. An example network element is illustrated in FIG. 2. The network element 201 can include a network processor 203 that processes packets received from incoming physical ports 221 and transmitted by the outgoing physical ports 223, which each connect the network element to a network or set of networks. A 'set,' as used herein refers to any positive whole number of items including one item.

The incoming physical ports 221 and outgoing physical ports 223 manage physical and link level data processing. The incoming physical ports 221 handle incoming data traffic at the physical and link level by framing or similarly processing the incoming signal and providing this data to the network processor 203 for further processing. Similarly, the outgoing physical ports 223 handle outgoing data traffic at the physical and link level by deframing or similar processing to transmit it to other devices over a connected network. These two sets of ports function together to enable communication with any number of other devices over a network using any number or combination of links.

The network processor 203 can include a set of switch modules, virtual ports and protocol agents amongst other components. Those components relevant to understanding the OpenFlow OAM process are illustrated and discussed while other components are omitted for sake of clarity. The switch modules can include non-OpenFlow switch modules 205 and OpenFlow switch modules 209. Non-OpenFlow switch modules 205 can be any number of modules dedicated to processing the forwarding and handling of data packets including e.g., the creation or termination of OAM frames. The OpenFlow switch module 209 is described herein in further detail in regard to FIGS. 3A and 3B. The OpenFlow switch module 209 implements the flow table and manages the forwarding and processing of all OpenFlow data packets.

The OpenFlow protocol agent 207 manages the communication between the network element 201 and the controller. The OpenFlow protocol agent 207 processes the OpenFlow control messages received from the OpenFlow controller and generates OpenFlow messages to the controller as needed. The OpenFlow protocol agent 207 can include support for receiving configuration messages to insert OAM packets into a data flow and can include support for sending received OAM packets to the OpenFlow controller for processing.

In one embodiment, the virtual ports 211A and 211B can optionally provide a pre-processing of OAM packets received by the network element 201. OAM packets can be directed to these virtual ports to process and update the meta data of these OAM packets. In one embodiment, OAM packets can be directed to these virtual ports by sources of the OAM packets in which case the meta data of the OAM packets is updated by the port as directed by the source to ensure proper forwarding or processing by the OpenFlow switch module.

In another embodiment, the virtual ports 211A and 211B modify or update the meta data in a manner specific to that virtual port. In this embodiment, the sources of the OAM packets direct the OAM packets to the virtual ports so that they will be processed in the manner known for that virtual port.

Packet Identification

The embodiments of the invention describe a generic configuration method for identifying certain packets of an OpenFlow data flow in an OpenFlow switch, which allows the identification of those packets and ensures the fate sharing with packets belonging to the data flow.

To identify specific packets, such as OAM packets in an OpenFlow data flow, the embodiments of the invention utilize fields in the OpenFlow data packets that are not utilized during matching (i.e., not considered when determining how a data packet is to be forwarded across a network). Such fields are referred to as wildcard or wildcarded fields. These fields can be used to distinguish a certain packet from the other data packets in a data flow by an OpenFlow switch. Any number or combination of these fields of the OpenFlow packets can be selected as a matching field so long as they are not taken into account in identifying the data flow or for making forwarding decisions. The value used to identify the OAM packets when placed in the selected matching field's domain can be any value that is not used by any valid data packet.

FIG. 4 is a diagram of an example OpenFlow matching structure encompassing a data packet or data frame. In the illustrated example wildcard sections and fields can be used to identifying certain packets (referred to as tagged packets) in the example cases of an Ethernet and/or an IP flow. Note these examples do not preclude the use of other fields, for example priority fields can be also used for tagging.

Packet Injection

In one embodiment, any OpenFlow switch that is directed by its OpenFlow controller or other source to inject packets (referred to as tagged packets) such as OAM packets into a data flow is dealing with packets to be injected that are generated by an entity (i.e., source) that may not be a part of the OpenFlow forwarding mechanism. Such an entity can be for instance an external OAM module attached to the switch (e.g., the non-OpenFlow switch module 205) or the OpenFlow controller. The tagged packets generated by such entities can be received by the OpenFlow switch module through virtual ports. In one embodiment, any packets entering the OpenFlow switch module through a physical or virtual port must be sent through the whole packet processing pipeline.

FIGS. 3A and 3B are diagrams of two example embodiments of the processing, injection and detecting of the OpenFlow OAM packets in an OpenFlow switch module. The processes implemented by these example OpenFlow switch modules each start with the initial processing of the data flows at the first flow table. In one example configuration illustrated in FIG. 3A, the data packets of different smaller flows can be aggregated into a common larger flow. A flow entry will be defined in the flow tables for each smaller flow; the actions of these entries will direct the update of the data packets to fit them into the new aggregated flow. A second flow entry can be deployed in a subsequent table that will describe the common flow.

The example embodiments of the invention adds a new module, the Packet Inject Logic (PIL) 301, to the OpenFlow switch module 109 and places it in front of the packet processing pipeline. The PIL 301 checks the meta data associated with each received data packet or the content of the data packet to determine whether to send the data packet through the default processing pipeline starting with the first table after the PIL 301 or to insert the data packet into a subsequent flow table in the pipeline. In this latter case the PIL 301 can also define meta data (i.e., write meta data to the data packet) that can be considered during matching in the subsequent tables.

In the first example embodiment in FIG. 3A, the PIL 301 utilizes the extensible matching capability of OpenFlow 1.1 to implement a PIL analysis based data packet handling process. The PIL module 301 is implemented by the first flow table and the other flow tables are shifted to the next subsequent flow table. For instance the first flow table is actually implemented by the second flow table, and so on. The matching performed by each flow table examines the meta data provided together with the packet data and/or the header fields of the data packet can be considered. In this latter case, a new matching type can be defined if the standard matching types cannot match on the desired packet fields. In this example PIL analysis embodiment, the new PIL matching table 303 lists all packets that should be inserted into later pipeline stages while the default action for that table (i.e., what to do with non-matching packets) is to send these non-matching packets to the next table.

In the second example embodiment illustrated in FIG. 3B, the PIL module 301 implements a meta data directed data packet handling process. The PIL module 301 receives the meta data passed together with the data packet, where this meta data explicitly determines at what pipeline stage the packet must be included into the common data flow. In this embodiment, the PIL module 301 reads the meta data of each data packet and passes the data packet to the proper flow table or to the group table to join the data packet to the common flow. In this example meta data directed packet handling embodiment, the meta data or packet data can include any number of attributes such as an attribute that is (1) the identifier of the flow table (0-255 according to OpenFlow 1.1) to which the data packet is to be forwarded. In the case when the packet is sent directly to the Group Table, then the attribute can be (2) the table ID set to a value out of the flow table id domain (e.g., 256 in case of OpenFlow 1.1). Other attributes can include (3) the Group ID where the table ID can be set to the Group Table constant otherwise it may not be considered) and other (4) meta data to be used during matching.

To realize the first example PIL analysis based embodiment illustrated in FIG. 3A, the content of the OpenFlow OAM packets (tagged packets) is utilized (i.e., used for matching) to determine how the OAM packet is to be handled. In the case of OAM packets, the content of the OAM packet must be checked (for instance MEP IDs) to select the appropriate table or group. To match on these fields the OpenFlow switch module can implement a new matching type. Furthermore, these new matching types are specific to the type of the tagged packet. In some limited scenarios, the current switch implementation can support the packet injection without any significant hardware updates. Rather, the functionality described herein can be partly or wholly implemented in software configuration by configuring the OpenFlow switch module 109 to shift the standard flow table processing and insert the PIL into the first flow table.

In the second meta data directed implementation illustrated in FIG. 3B, extensions to the OpenFlow switch module 109 are necessary. However, these extensions are not solution specific. Since the decision on what to do with the packet is actually determined by a module external to the OpenFlow switch module the changes to the OpenFlow switch module to include the PIL module 301 can be generic to all scenarios.

In regard to the OpenFlow switch module 109 configuration, the first PIL analysis based embodiment of FIG. 3A, requires continually maintaining and configuring the first table (i.e., the PIL module 301). To insert a new class of tagged packet in PIL module 301, the first table must be extended with appropriate flow rules to match and handle the new class of tagged packet. In the second meta data directed implementation of FIG. 3B, there is no need to do continual configuration management.

Virtual Ports

Both implementations illustrated in FIGS. 3A and 3B assume that some information is provided and attached as meta data to the data packet being processed by the PIL, where this meta data is provided or attached by the physical or virtual port from which the data packet is received by the OpenFlow switch module. In one embodiment, the physical and or virtual ports are extended such that the ports shall be able to pass meta data along with the data packet to the OpenFlow switch module and the PIL in the OpenFlow switch model is be able to interpret the received meta data during packet processing. Depending on the source of such information placed into the meta data by the physical port or virtual port two alternative embodiments are differentiated an external source embodiment and an internal definition embodiment.

In an external source embodiment, the meta data is generated by the source of the packet, e.g., the OpenFlow controller. In this case a virtual port copies the meta data provided by the source into the meta data of the data packet to be passed to the OpenFlow switch module. This external source embodiment does not require any configuration updates of existing OpenFlow virtual port configuration procedures.

In the internal definition embodiment, the meta data for a data packet is generated by the virtual port itself. In this embodiment, the granularity of the definition of the meta data is tied to the receiving virtual port, i.e., all packets from the same virtual port will be treated in the same way; each of the data packets will be given the same meta data and as a result will be injected by the PIL into the same stage of the pipeline. The configuration of these virtual ports can be a specialized process or protocol managed by the OpenFlow controller.

In regard to the handling of OAM packets, the OpenFlow controller is one source of the OAM (tagged) packets. For instance the OpenFlow controller may want to check whether an OpenFlow data flow is configured properly. If the system utilizes the meta data directed packet handling embodiment, then the source of the data packet must provide the meta data, as well. To make the OpenFlow controller fulfill this requirement, the OpenFlow protocol can be extended as described herein below.

OpenFlow Message Option for Controller Generated Tagged Packets

A new OpenFlow message option defines a new OpenFlow controller-to-switch message comprising the following fields: (1) a common OpenFlow header, which encodes the OpenFlow protocol version, the type and the length of the message and a transaction identifier; (2) an identifier of the incoming port, which is considered during matching as in_port; (3) a start table index, where the packet is injected, which can be set either to a valid table index or to a GROUP_TABLE constant; (4) a group identifier, which is valid if a start table index is set to a GROUP_TABLE constant, otherwise, it must be set to 0 by the controller and must be ignored by the switch; (5) meta data to be used during matching; and (6) the OAM packet to be inserted. An example layout of this message is illustrated in FIG. 5.

The GROUP_TABLE constant must be outside of the valid flow table indexed to avoid collision. In Open Flow 1.1, the flow tables are indexed from 0 to 255. So the GROUP_T-ABLE can be any value larger than 255.

OpenFlow Action Option for Controller Generated Tagged Packets

The embodiments of the invention define a new action for use in implementing the monitoring of OpenFlow flows and other OAM function. This action option can make use of the existing Packet Out message specified by the OpenFlow 1.1 standard. According to the standard, the Packet Out message can instruct the OpenFlow switch to send a packet through the processing pipeline by including an OFPAT_OUTPUT command where the out port is set to OFPP_TABLE virtual port. However, the command only expresses that the packet must be sent through the pipeline but does not enable specifying at which stage in the processing pipeline of the OpenFlow switch module to insert it. This embodiment defines a new action that is referred to herein as an OFPAT_INJECT_PACKET, which comprises the following fields: (1) a table index encoding the flow table index or an indicator that the group table is to be utilized (through GROUP TABLE constant); (2) a group entry identifier identifying a group table entry if the table index is set to the GROUP_TABLE constant, otherwise this value is set to null and must be ignored by the PIL of the OpenFlow switch module; and (3) a meta data field to be used during packet processing (i.e., matching) in the processing pipeline. An example layout of the action is illustrated in FIG. 6.

To inject a tagged packet (e.g., an OAM packet) into the processing pipeline by the controller, the Packet Out message can include an OFPAT_INJECT_PACKET action in its action field and not an OFPAT_OUTPUT action.

Figure 7A:
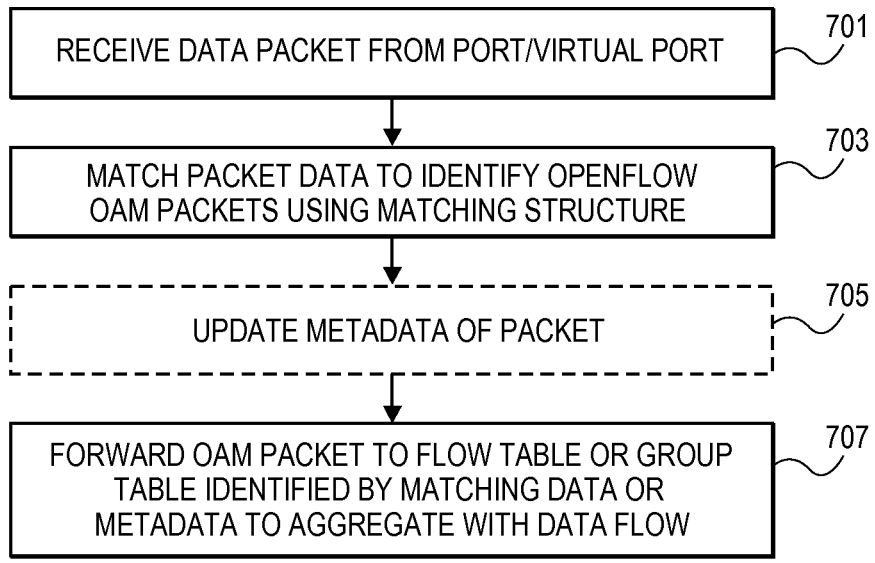
FIG. 7A is a flowchart of one embodiment of a process for inserting an OpenFlow OAM packet by the OpenFlow switch module.
Figure 7B:
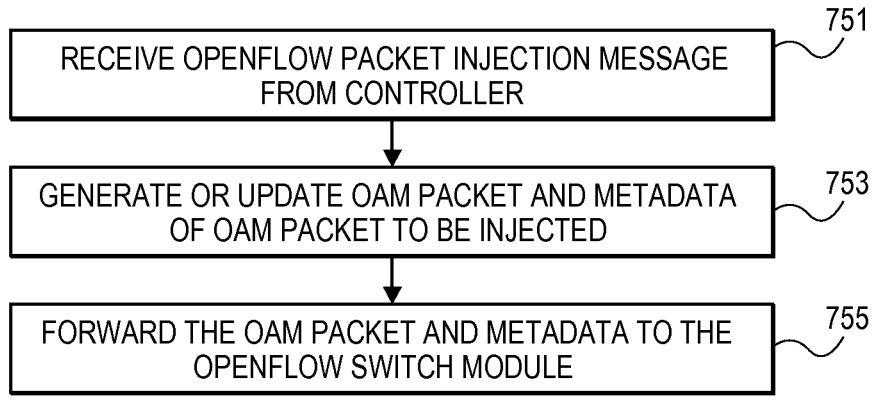
FIG. 7B is a flowchart of one embodiment of a process for preparing an OpenFlow OAM packet by a virtual port of the network element.

FIGS. 7A and 7B are flowcharts of one embodiment of the processes of the PIL module and the virtual port, respectively, implementing the packet injection process and system described herein above. In regard to the PIL module, the process as illustrated in FIG. 7A, is initiated in response to receiving a data packet from the physical or virtual port (Block 701). The PIL module examines each incoming packet by using either the PIL analysis based packet handling or meta data directed packet handling. In either case the PIL matches packet data to identify packets for monitoring data flows such as OAM packets and to determine which of the packet processing pipeline stages to forward the data packet to implement the insertion of the data packet into the common data flow (Block 703). In the PIL analysis based process, the PIL module identifies the pipeline stage based on matching rules that can include any field of the data packet, the entire matching structure as described above or any combination or sub-combination thereof. The matching includes a match on the packet including a tag identifying the data packet as an OAM packet or similar packet for monitoring data flows. In the meta data directed analysis, the matching rule identifies the OAM packets based on the tag, but then primarily identifies the pipeline stage for forwarding based on the meta data identification of the stage that has been defined by the port through which the OpenFlow switch received the data packet. Data packets that are not tagged are forwarded to a default pipeline stage, which is typically the next stage in the pipeline.

In some embodiments, before forwarding the data packet to the determined pipeline stage, an action of the PIL module correlated with the matching rule can be executed to update the meta data of the data packet (Block 705). The update of the meta data can influence the processing of the data packet in the pipeline stage to which it is being forwarded. After the meta data is updated the data packet is then forwarded to the identified pipeline stage (i.e., a flow table or group table) (Block 707).

FIG. 7B is a flowchart of the process of processing packets at the virtual port. In one embodiment, the process is initiated in response to receiving an OpenFlow packet injection message from a controller or a similar source of a data packet to be inserted into a data flow (Block 751). The virtual port can process each data packet using either an external source based process or an internal definition process. In either case, the virtual port can generate a data packet to be inserted into a data flow as directed by the incoming message from the OpenFlow controller and define meta data for the data packets to be sent to the OpenFlow switch module (Block 753). The meta data can be determined based on information defined in the incoming message (external source based process) or can be determined by the virtual port that the message is directed to (internal definition process). After the data packet and meta data have been generated based on the external source based process or the internal definition process, then the data packet and meta data are forwarded to the OpenFlow switch module (Block 755).

Tagged Packet De-Multiplexing Process

The de-multiplexing or removal and processing method is a process implemented in a destination or egress OpenFlow switch. The de-multiplexing process enables the monitoring of the OpenFlow data flow along its path up to the destination OpenFlow switch. Any supporting OpenFlow switch that identifies the monitored data packets, such as OAM packets, is referred to herein as an egress OpenFlow switch. At the egress OpenFlow switch two flow table entries can be defined: (1) first flow table entry defines criteria for identifying the tagged data packets and defines their treatment, and (2) a second flow table entry defines the treatment of the other data packets. The treatment of the tagged packets can be encoded by either a specific OpenFlow action or can be expressed by sending the tagged packet to a well defined virtual port. In this latter case, the sending of the tagged packet to a virtual port either triggers an OpenFlow control message that encodes information related to the tagged packet, or relays the tagged packet to an specific switch module. The control message with the encoded information is sent to the OpenFlow controller to enable OAM functions. The two alternative processes for handling the tagged packets are further discussed below.

Switch Local Termination Process

In this embodiment of de-multiplexing the tagged data packets, the tagged data packets or frames are forwarded to a non-OpenFlow switch module, which is separate from the OpenFlow switch module and pipeline process. The non-OpenFlow switch module and the OpenFlow switch module can communicate with each other through a virtual port. The non-OpenFlow switch module can pass meta data to the OpenFlow switch module. This switch local termination process specifies that the OpenFlow switch module is able to pass meta data through the virtual port to the other switch modules. If no non-OpenFlow switch module that is able to process the meta data is available, then the virtual port is able to suppress the meta data, i.e., drop it without processing it.

Controller Targeted Process

In this embodiment of de-multiplexing the tagged data packets, the tagged data packets are relayed (i.e., forwarded) to the controller. The Packet In message can be used to implement this feature without any modification. However, the Packet In message does not pass all meta data of a data packet to the controller, as the message carries only the incoming port (physical and/or virtual) and the table ID. Therefore the following additional fields to the Packet In message are defined to support this controller targeted process by adding: (1) a GROUP/FLOW TABLE selection flag indicating the data packet is received after processing by a flow table or by the group table. If this GROUP/FLOW TABLE flag is set to 0, then the table_id field carries the index of the flow table. Otherwise, the table_id must be set to 0 by the PIL of the OpenFlow switch module and should be omitted during processing by the controller; (2) a metadata field, carrying the value of the meta data field used during packet processing; (3) a Group ID field that defines the identifier of the executed group table entry. It carries valid information if the GROUP/FLOW TABLE selection flag is set to 1. Otherwise, this field must be set to 0 and should be ignored by the controller.

Figure 8:
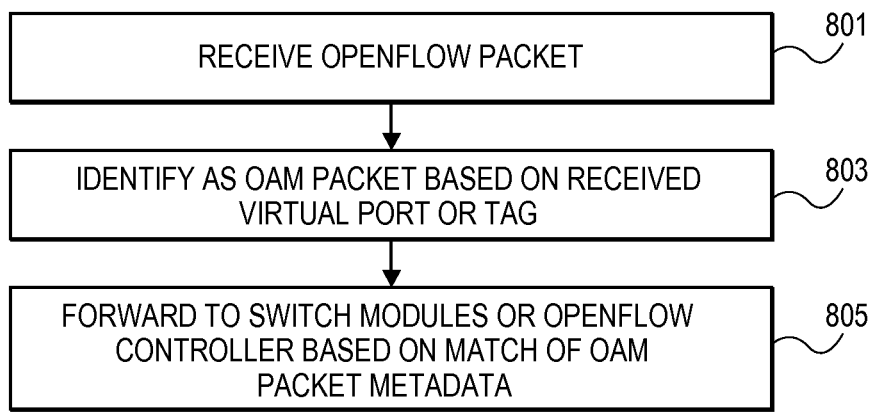
FIG. 8 is a flowchart of one embodiment of a process for de-multiplexing.

FIG. 8 is a flowchart of one embodiment of the de-multiplexing process. In one embodiment, the process is initiated in response to receiving an OpenFlow data packet at an OpenFlow switch module (Block 801). The data packet is initially processed by the PIL module to match on the identity of the packet as a monitored (e.g., OAM packet) by checking a designated field of the data packet for a designated value that identifies the packet as a monitored data packet (Block 803). The header or meta data of the received packet can be used for identifying the packet as a monitored packet, an entire matching structure or any combination thereof can also be utilized. In one embodiment, a virtual port that received the data packet can modify the meta data to identify the data packet as a monitored data packet. As a separate or combined step, the data packet can be matched to determine whether the data packet is to be forwarded to a non-OpenFlow switch module or to an OpenFlow controller (Block 805). This can be encoded in the meta data or header of the data packet. The data packet can be forwarded to the non-OpenFlow switch module to be processed when for example the data packet is an OAM packet generated and monitored by an OAM module separate from the OpenFlow controller. The data packet can be sent to the OpenFlow controller using a control message to provide the entire data packet including the meta data when for example the data packet is an OAM packet and the OAM module is a part of the OpenFlow controller.

Example 1

Ethernet Packet Flow

This section gives an example use of an embodiment of the invention as applied to frame identification, and configuring frame injection and de-multiplexing of OAM frames for an Ethernet flow.

Identification

In the first example Ethernet flows are deployed, i.e., only the Ethernet header fields are utilized for matching and handling the data packets, including the source and destination MAC address, and VLAN tag fields. There are no restrictions on the payload of the Ethernet packet.

The DL_TYPE of the matching structure, which defines the Ethertype field of an Ethernet packet, will be wildcarded. According to this example embodiment of the invention, this DL_TYPE field is selected to distinguish data packets. To select an appropriate value from the available domain (16-bits), one non-allocated Ethertype value can be selected. For example, a value can be selected that does not collide with the allocated Ethertype values defined by IANA.

At the ingress side of the monitored flow, the following configuration is set. Only a single matching table is used. To inject the OAM frames, the packet headers are the same as for the service packets, except the Ethertype, which is set to OAM (e.g. 0xD001). The matching rule is configured as: the Ethernet dst is the real destination address, while all other fields are wildcarded. The action is to send to the next table or output port.

At the egress side, a single table is used with two flow entries. The first flow entry is for the OAM traffic. Matching is set as: Ethernet dst=the real destination address, Ethertype=OAM (e.g. 0xD001), all other fields are wildcarded. Rule priority=101. Action=send to OAM port.

The second flow entry is for the service traffic. Matching is: Ethernet dst=real destination address, all other fields are wildcarded. Rule priority=100. Action=send to next table or output port.

Example 2

MPLS Packet Flow

This section gives an example use of an embodiment of the invention on frame identification, and on configuring frame injection and de-multiplexing of OAM frames for an MPLS flow.

Identification

In the second example MPLS flows are considered and the following flow matching entries are used during forwarding. The Ethernet fields may or may not be set, but Ethertype is set to either 8847h or 8848h. The MPLS label matching field is set to a valid label value (between 16 and 1048576). All other matching fields will not be considered during matching according to the OpenFlow 1.1 standard. Then a second label is used for packet exceptions. The OAM packets can be identified e.g. by setting the second label with a value from 0-15 that is not specified by other standards.

At the ingress side, a single table is used with one flow entry. To inject the OAM fames, the packet headers are the same as for the service packets, except an additional MPLS header is used, with the OAM (e.g. 10) label. The flow table entry is configured as matching: Ethertype=0x8847, MPLS=given_label, all other fields are wildcarded. Action=push given_label and send to next table or output port.

At the egress side, two tables are used. The first table contains a single flow entry, for both the monitored and the monitoring packets. The matching is set to the given_label, all other fields are wildcarded. The action is to remove the label and go to the second table. The second table contains two entries. The first one is for the monitoring packet, with a matching Ethertype=0x8847, MPLS=OAM (e.g. 10), all other fields are wildcarded. Priority: 101. Action: send to OAM port. The second entry is for the monitored traffic, with matching set to Metadata=given label, all other fields are wildcarded. Priority=100. Action=send to next table or output port.

Example 3

IP Packet Flow

This section gives an example use of an embodiment the invention for frame identification, configuring frame injection and injection of OAM frames into an IPv4 flow.

Identification

In the case of an IP flow, the Ethernet fields may or may not be set, but the Ethertype is set to 0800h. The IP header fields are considered, like source and destination IP address and there are no restrictions on the payload of the IP packet. Then the Protocol of the IP matching structure, which reflects to the next encapsulated protocol of an IP packet, will be wildcarded. According to one example realization of this invention, this field will be selected to distinguish certain packets.

At the ingress side a single table is used. To inject the OAM fames, the packet headers are the same as for the service packets, except the IPv4_proto field, which is set to a new OAM (e.g. 250) type. The matching of the flow entry is set to EtherTpye=0800, IP destination: given destination address, all other fields=wildcarded. The Action is to send to next table or output port.

At the egress side one table is used, with two entries. The first flow entry is for the OAM traffic. Matching is: Ethertype=0800, IP destination: given destination address, IPv4_proto: OAM (e.g. 250), all other fields are wildcarded. Rule priority=101. Action=send to OAM port. The second flow entry is for the service traffic. Matching is: EtherTpye=0800, IP destination=given destination address, all other fields are wildcarded. Rule priority=100. Action=send to next table or output port.

Figure 9:
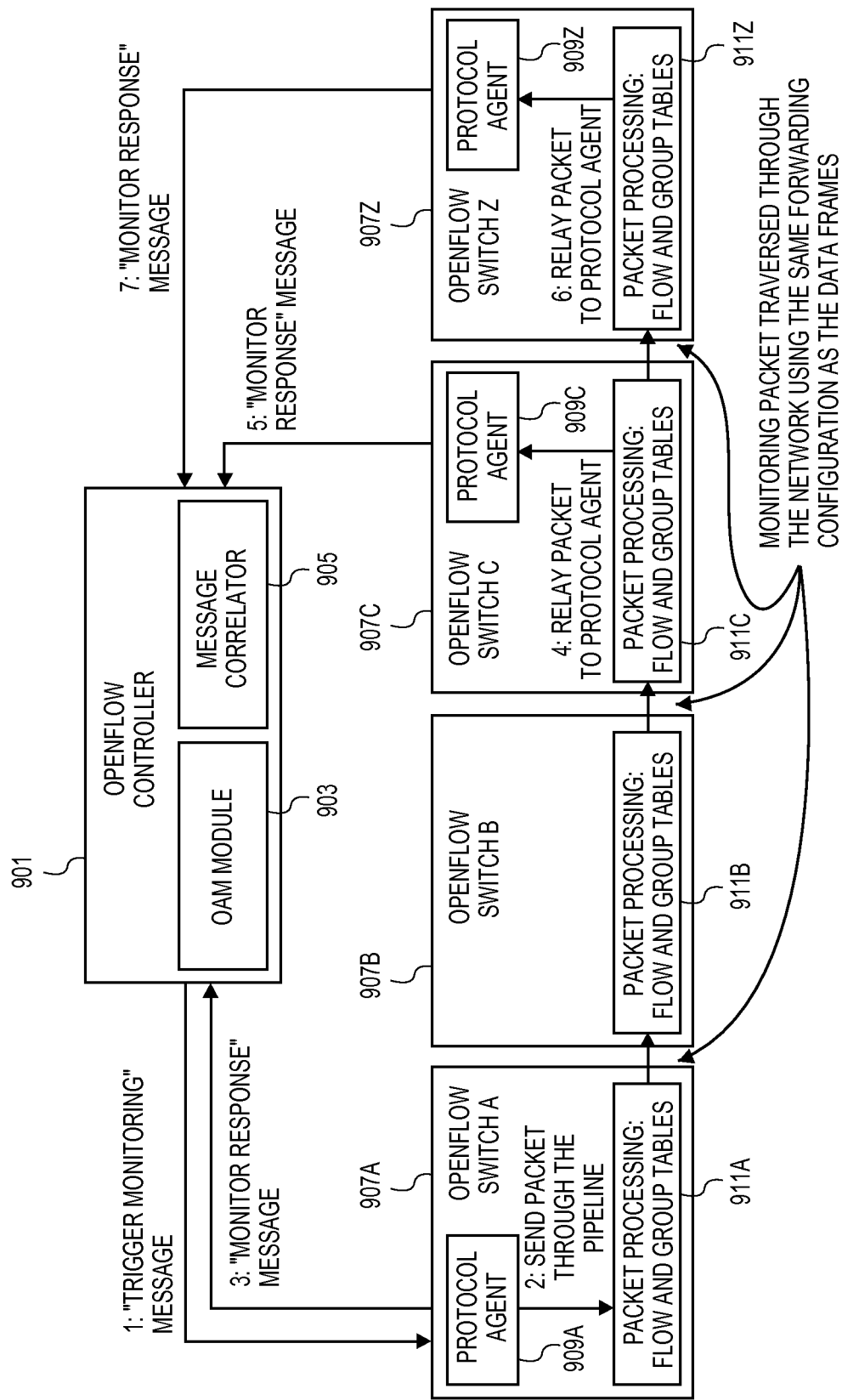
FIG. 9 is a diagram of one embodiment of an OpenFlow network supporting OAM.

FIG. 9 is a diagram of one embodiment of an OpenFlow network supporting OAM. In one embodiment, the OAM is implemented by deploying OAM related control and logic at the OpenFlow controller 901. The OpenFlow switches 907A-Z implement basic and generic OAM support functions that provide the OpenFlow controller 901 with sufficient information about the state of the OpenFlow network and the OpenFlow data flows within the OpenFlow network to implement a set of OAM functions. FIG. 9 further illustrates an example organization of the components of the OpenFlow controller and OpenFlow switch and an example set of message exchanges performed between the components to enable OAM functions. The example network includes a single OpenFlow controller 901 and a set of OpenFlow switches 907A-Z. One skilled in the art would understand that any number of OpenFlow controllers and OpenFlow switches can be organized and configured to implement the principles and structures described herein. For sake of clarity the example configuration utilizes one OpenFlow controller and four OpenFlow switches.

The OpenFlow controller 901 can include an OAM module 903 and a message correlation module 905. The OAM module 903 can manage the implementation of OAM functionality within the OpenFlow controller 903. The OAM module 903 can receive requests for OAM related data or instructions to execute OAM functionality from other OpenFlow controller components (not shown) or from other sources external to the OpenFlow controller 901. The OpenFlow OAM module 903 can support OAM functions including connectivity verification (CV), link trace (LT), loss measurement (LM), delay measurement (DM), continuity checks (CC) and similar OAM functions.

The OAM module 903 can be assisted by a message correlator 905. The message correlator can be a separate module within the OpenFlow controller 901 or can be a component of the OAM module 903. The message correlator 905 receives and sorts incoming monitor response messages from the OpenFlow switches 907A-Z in the domain of the OpenFlow controller 901. The message correlator 905 matches incoming monitor response messages with the requested OAM functions being executed with the OAM module 903. The message correlator 905 can match the incoming monitor response messages based on an explicit identifier within the monitor response message, meta data within the monitor response data or similar information within the monitor response data. The OAM module 903 can also make identifiers and meta data associated with each requested OAM function available to the message correlator 905 to enable the matching of the monitor response messages. In one example embodiment, the message correlator 905 matches the monitor response messages with the requested OAM functions based on an OAM packet or similar data that is included with the monitor response message. The received OAM packet is matched with an OAM packet generated by the OAM module 903 and sent out through a trigger monitoring message to the OpenFlow switch 907A.

The OAM module 903 and/or message correlator 905 implement a general monitoring procedure as shown in the Figure. The process can be initiated in response to a request for any OAM function from any source including sources internal and external to the OpenFlow controller 901. The OpenFlow controller 901 sends a "trigger monitoring" message to OpenFlow switch 907A requesting that OpenFlow switch 907A send an OAM packet or similar 'probe' packet through the packet processing pipeline 911A of the OpenFlow switch 901A. The trigger monitoring message is received at the OpenFlow switch 907A by a protocol agent 909A or similar component. The protocol agent 909A can generate the OAM packet to be sent to the packet processing pipeline as discussed herein above, for example by extracting the OAM packet from the trigger monitoring message. The OAM packet is to be sent through the packet processing pipeline 911A to cause the packet processing pipeline and the protocol agent 909A to generate and return a "monitor response" message to the OpenFlow controller 901.

Switch 907A handles the OAM packet through the packet processing pipeline implemented by the OpenFlow switch module as described herein above. The packet processing pipeline collects the matched flow table and group table entries and similar metric data associated with these table entries from a set of counters and similar mechanisms maintained by the OpenFlow switch module. The OpenFlow switch module aggregates the OAM packet with a designated OpenFlow data flow such that it has fate sharing with the OpenFlow data flow. In the illustrated example, the OAM packet will be sent to OpenFlow switch 907B. OpenFlow switch 907A, after processing the OAM packet in the packet processing pipeline, sends a monitor response message to the OpenFlow controller 901 encoding the matched flow table entries and group table entries together with the associated metric data. This data provided by the monitor response message is collected and inserted into the message by the protocol agent 909A.

The OAM message and the associated OpenFlow data flow are received by the OpenFlow switch 907B at an intermediate OpenFlow switch 907B. In the illustrated example, OpenFlow switch 907B does not implement the OAM supported embodiment described herein. Thus, the OpenFlow switch 907B processes the OAM packet 907B as it would any other OpenFlow data packet specifically in the same manner as the OpenFlow data flow that the OAM packet is associated with. In the example, OpenFlow switch 907B forwards the OAM packet and associated OpenFlow data flow to the OpenFlow switch 907C.

OpenFlow switch 907C receives the OAM packet and processes it according to the configuration of its packet processing pipeline 911C in the OpenFlow switch module. In addition, the protocol agent 909C sends a copy of the OAM packet to the OpenFlow controller 901 along with the matched flow table entry and group table entry data, including counters and the associated metric data for the OAM packet and associated OpenFlow data flow. This information is sent to the OpenFlow controller 901 in a monitor response message. According to the configuration of the OpenFlow switch 907C, the OAM packet is then forwarded to the next OpenFlow switch 907Z.

OpenFlow switch 907Z receives the OAM packet and processes it according to the configuration of its packet processing pipeline 911Z in the OpenFlow switch module. In addition, the protocol agent 909Z sends a copy of the OAM packet to the OpenFlow controller 901 along with the matched flow table entry and group table entry data, including counters and the associated metric data for the OAM packet and associated OpenFlow data flow. This information is sent to the OpenFlow controller 901 in a monitor response message. According to the configuration of the OpenFlow switch 907Z, the OAM packet may then be discarded as the associated OpenFlow data flow has reached an endpoint in the OpenFlow network or the last monitored network element in the OpenFlow network (i.e., only a portion of the path through the OpenFlow network may be monitored).

In one embodiment, the protocol agent encompasses the processes and structures described herein in regard to FIGS. 1-8 to inject OAM packets into the packet processing pipeline of the OpenFlow switch module as described in regard to FIGS. 1-8. Similarly, the protocol agent can also encompasses the processes and structures described herein with reference to FIGS. 1-8 for de-multiplexing OAM packets and generating the OpenFlow control messages for the OpenFlow controller targeted de-multiplexing. Generally, the OAM implementation described with regard to FIGS. 9-14 can be implemented relying on the general packet monitoring features described with regard to FIGS. 1-8.

Trigger Monitoring Messages

The trigger monitoring message instructs an OpenFlow switch to process an OAM packet in the packet processing pipeline of the OpenFlow switch module and to send a report of metric information back to the OpenFlow controller through monitor response messages. The trigger monitoring message can carry the entire OAM packet or can identify an OAM packet to be generated by the OpenFlow switch. There are several methods for implementing the trigger monitoring message in OpenFlow. The trigger monitoring message can be a revised Packet Out message, an extended Packet Out message or a new OpenFlow message type.

Each of the trigger monitoring messages generates similar behavior in OpenFlow switch. When an OpenFlow switch receives a trigger monitoring message from the OpenFlow controller containing an OAM packet, the OpenFlow switch will respond by collecting metric information about the processing of the OAM packet and/or the associated OpenFlow data flow. The data collected can include information about all flow table and group table matches incurred during the OAM packet traversal of the OpenFlow switch. When the OpenFlow switch finishes the processing of the OAM packet it replies to the OpenFlow controller with a monitor response message containing the collected metric information.

The trigger monitoring message can also identify or define some instructions for the handling the OAM packet. For instance, a trigger monitoring message can query some actions to be performed on the OAM packet, define through what output port the OAM packet is to be sent out, send the packet through the whole packet processing pipeline, and provide similar instructions for OAM packet handling.

Revised Packet Out Message

The Packet Out message specified by OpenFlow enables the OpenFlow controller to be able to insert packets into the packet processing pipeline of an OpenFlow switch or to send a packet on any ports of the OpenFlow switch. In one embodiment, an implementation option for the trigger monitoring message is to consider the packet out message as the trigger monitoring message. In this case, the OpenFlow switch will be configured to collect the metric information on all packets sent by the OpenFlow controller via the use of the Packet Out message and to generate a report on what happened to the packet in the form of a monitor response message including the collected metric information data.

Extended Packet Out Message

In one embodiment, a Packet Out message specified by OpenFlow is extended to implement the trigger monitoring message. The extended Packet Out message specifies a new action, the OFPAT_TRIG_MON action. If the protocol agent of an OpenFlow switch receives a Packet Out message and finds this new action in the action list of the Packet Out message, then it applies the additional procedures described in regard to the trigger monitoring message. Otherwise protocol agent performs the standard packet out operation as specified by the OpenFlow standard.

FIG. 10 illustrates one embodiment of the OFPAT_TRIG_MON action. Since existence of the action in a Packet Out message indicates the trigger monitoring message procedures according are to be executed, the action does not carry additional fields. The OpenFlow specification indicates that an action should be at least 8 octets long, therefore a 4 octet long padding field is defined to bring the action into conformance with this aspect of OpenFlow.

New OpenFlow Message

In one embodiment, a new OpenFlow message is used to implement the trigger monitoring message. This message carries the same fields as the Packet Out message. The protocol agent and packet processing pipeline of the OpenFlow switch are configured to handle the new OpenFlow message and the included OAM packet in a manner similar to the Packet Out message except that the metric tracking and reporting is initiated. The fields, their format, and the associated packet handling rules can be the same or similar to those specified in Section A.3.7 of the OpenFlow 1.1 specification. To distinguish the new OpenFlow message and the OpenFlow Packet Out message, a new OpenFlow message type can be allocated.

FIG. 11 is a flowchart of one embodiment of a process for OAM function request processing. In one embodiment, the process of OAM function request processing is initiated in response to receiving a request for an OAM function (Block 1101). The OAM function request can be received from any source including other OpenFlow controller components and external network administration software or similar sources. The OAM module of the OpenFlow controller processes the OAM request by generating a trigger monitoring message defining or specifying actions to be performed by an OpenFlow switch to provide metrics for an OpenFlow data flow (Block 1103). The trigger monitoring message includes an OAM packet that is to be forwarded and aggregated with the OpenFlow data flow. The characterstics of the OAM packet thus match those of the OpenFlow data flow necessary for ensuring fate sharing with the OpenFlow data flow as described herein above. The actions defined or specified by the trigger monitoring message include the actions to insert the OAM packet into the packet processing pipeline of the OpenFlow switch or the actions to forward the OAM packet to a particular port.

The generated trigger message is sent to the OpenFlow switch at which the monitoring of the OpenFlow data flow is to be initiated (Block 1105). This will commence a monitoring of the OpenFlow data flow at each downstream OpenFlow switch that has been configured to support generic or OAM specific packet monitoring as described herein. The OpenFlow controller then awaits the OAM related metric data to be returned from each of the supporting OpenFlow switches along the path of the OpenFlow data flow. This metric data is received in the form of monitor response messages from each of the supporting OpenFlow switches (Block 1107). The received monitor response messages include a copy of the OAM packet or an identifier thereof along with the metric information.

These monitor response messages can initially be processed at the OpenFlow controller by the message correlator to correlate the monitor response messages with the OAM function request that initiated the monitoring process (Block 1109). The incoming monitor response messages can be matched with the requested OAM function using an identifier from the trigger monitoring message or OAM packet that was sent out by the OAM module of the OpenFlow controller. The message correlator can compile metric data or similarly preprocess the data before passing it onto the OAM module in the OpenFlow controller. In other embodiments, the metric data is not pre-processed and is only correlated by the message correlator. In further embodiments, the message correlation function is integrated with the OAM module.

The OAM module then processes the received metric data according to the OAM function that has been requested or the set of OAM functions that have been requested (Block 1111). The metric can be directly related to the monitoring of the OAM packet and/or the associated OpenFlow data flow. In either case, the metric data is representative of the OpenFlow data flow and utilize to derive OAM related information for the OpenFlow data flow. The results of the set of OAM functions are provided to the requesting source (Block 1113). The results can be a single response or can be an ongoing or intermittent response as the monitoring data is received dependent on the OAM function requested.

Detecting and Processing the OAM Packets at the OpenFlow Switches

Each OpenFlow switch in an OpenFlow network can be configured to support OAM functionality at the OpenFlow controller by recognizing OAM packets and reporting metrics related to the OAM packets and the related OpenFlow data flow. Each OpenFlow switch can be configured to relay the OAM packet or a copy of the packet to the protocol agent to trigger a monitor response message after the OAM packet has gone through the packet processing pipeline of the OpenFlow switching module.

The OAM packet is forwarded to a next OpenFlow switch if the current OpenFlow switch is not the egress or destination switch. If the OpenFlow switch is the egress switch or destination switch, then the OAM packet and associated metrics can be forwarded to the OpenFlow controller. If the OpenFlow switch is just an intermediate switch then the OAM packet may be forwarded to the next switch for further processing after the metrics are reported. If the OpenFlow switches are destination switches then reports for the metrics must be generated and the OAM packet is discarded. By default, the OpenFlow switch will forward the OAM packet like any other data packet in the associated OpenFlow data flow.

The OAM packet can be identified by, for example, checking some extra fields not considered during identifying the data packets in the associated OpenFlow data flow or by a specific payload being present in the OAM packet, as described further herein above.

The monitor response message is sent by the protocol agent to the OpenFlow controller and contains metric information about all flow table and group table matches in the OpenFlow switch module of the OpenFlow switch that the OAM packet traversed. These matches will be the same as for the data packets of the associated OpenFlow data flow, except for flow table or group table entries that identify the OAM packet as an OAM packet for purposes of generating the monitor response message. However, the OpenFlow controller is aware of this difference and can ignore these affects on the metrics or adjust the metrics for these affects.

Reading the Counters

As part of the standard OpenFlow packet processing, the detection of an OAM packet or similar 'probe' or monitored packet will cause a set of counters for the flow table and group table entries to be incremented as the packet traverses the packet processing pipeline of the OpenFlow switch module. The counters can be incremented for matches on both standard data packets as well as the specifically monitored packets such as the OAM packets. The updating of these counters can be continuous from the start up of the OpenFlow switch or in response to receiving a message from the OpenFlow controller. Detection of the monitoring packet can trigger the read out of the counters of each flow table or group table entry matched. The counter value can be included in the monitor response message as an element of a statistics field of the given flow table entry or similarly provided as metric information to be reported to the OpenFlow controller.

This readout of the counters can occur after the update of the counters and optionally before or after the executing the actions of the matched flow table or group table entry. However, whichever option is implemented, the timing in the processing at the OpenFlow switch (e.g., by the protocol agent) reads out the counters at the same time for standard data packets as for specifically monitored packets such as the OAM packets.

Time Stamping

In one embodiment, the packet processing at the OpenFlow switch also includes the recording of a time stamp when a data packet or monitored packet matches a flow table or a group table entry. For example, the time stamp can be stored as an 8-octet field with the format base on the Time Representation format defined by IEEE 1588-2002 "Standard for a Precision Clock Synchronization Protocol for Networked Measurement and Control Systems" or a similar format. The time stamp can be attached to the monitor response message as an element of the statistics field of the given flow table entry.

This time stamping can occur in the OpenFlow switch module after the matching of the packet with a flow table entry or group table entry, optionally before or after the update of the counters, and optionally before or after executing the actions of the flow table or group table entry. However, the timing of the time stamping is the same for both standard data packets and specifically monitored packets such as the OAM packets.

Monitor Response Message

In response to detecting the OAM packet or similar monitored packet, the OAM packet and the matched flow table and group table entries with associated metric information data is provided to the protocol agent of the OpenFlow switch, as discussed herein above. Then the protocol agent of the OpenFlow switch generates a monitor response message and sends the monitor response message to the OpenFlow controller. In one example embodiment, the monitor response message includes:

the OAM packet, to help the OpenFlow controller to correlate the monitor responses messages triggered by the same OAM packet but generated by different switches
   a list of statistic entries, where each entry contains:
      i. a reference to a flow table or group table entry, e.g. the identifier of the table and the cookie of the flow entry
      ii. optionally, a time stamp of the execution of the given table entry
      iii. optionally, the counter values of the given table entry The monitor response message can be implemented as an extension of the standard OpenFlow Packet In message, a new OpenFlow message type, or it also could be realized as an update to the flow statistics type OFPT_STATS_REPLY message.

Extended Packet in Message

Figure 12:
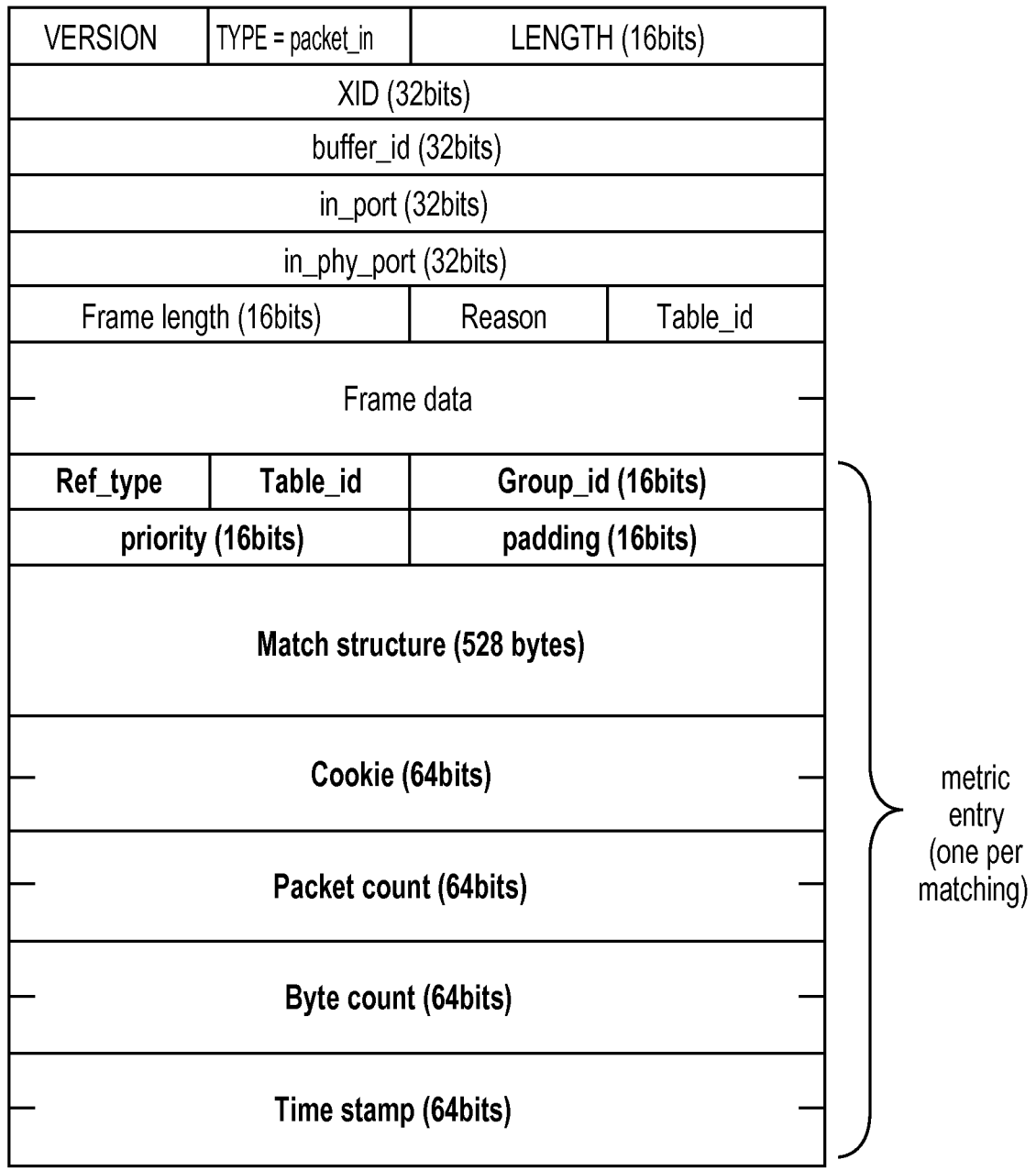
FIG. 12 is a diagram of one example embodiment of a monitor reporting message.

This implementation option extends the OpenFlow specified Packet In message with optional fields that carries a list of metric entries. FIG. 12 is a diagram of one example embodiment of a monitor reporting message implemented as an extended Packet In message. The version, type, length, XID, buffer_id, in_port, in_phy_port, frame length, reason, table_id and frame data fields remain the same as those of the basic Packet In message specified in OpenFlow 1.1. In this embodiment, these fields are followed by a set of fields that correlate with a metric entry for each flow table or group table match. The Ref_type field can be with a set of indicator bits where one bit of the field indicates whether the table that the metrics refer to is a flow table or a group table, one bit indicates whether there is a packet_count, one bit indicates whether there is a byte count, and one bit indicates whether there is a time stamp. The Table id, Group id, priority, match structure and cookie fields identify the corresponding flow or group table entry. The packet_count and byte count are a part of the flow table entry's statistics. The packet_count is the number of the OpenFlow data packets that have matched a given flow entry in the flow table. The byte count stores the total byte count of the associated data packet. This data can be used for performing OAM functions.

New OpenFlow Message

Figure 13:
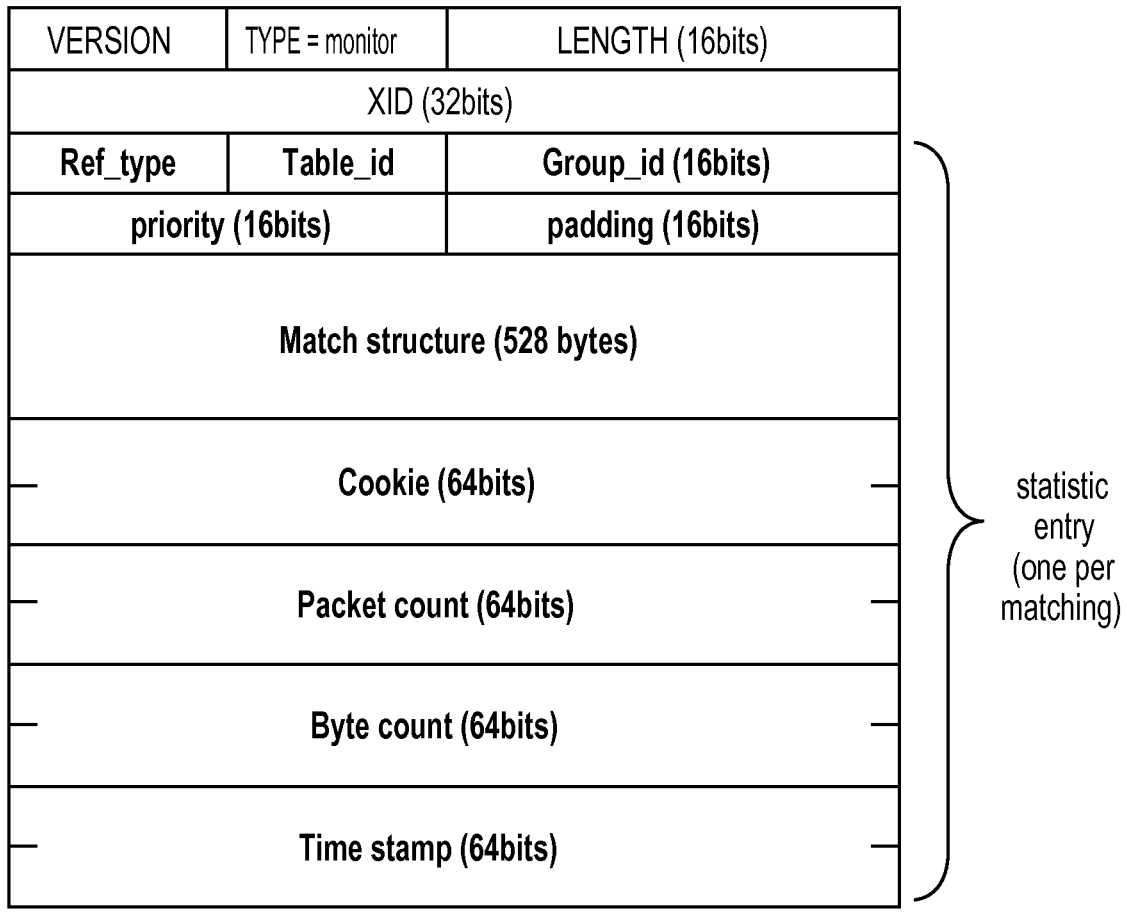
FIG. 13 is a diagram of one example embodiment of a monitor reporting message.

In one embodiment, the monitor response message is a newly defined OpenFlow message. FIG. 13 is a diagram of one example embodiment of a monitor reporting message implemented as a new OpenFlow message. A new OpenFlow message type is introduced for this message with the type 'monitor.' The version, type, length, and XID fields are similar to those of the Packet In message or extended Packet In message as described above and in the OpenFlow 1.1 specification. In this embodiment, these fields are followed by a set of fields that correlate with a metric entry for each flow table or group table match. The Ref_type field can be with a set of indicator bits where one bit of the field indicates whether the table that the metrics refer to is a flow table or a group table, one bit indicates whether there is a packet_count, one bit indicates whether there is a byte count, and one bit indicates whether there is a time stamp. The table id, group id, priority, match structure and cookie identify the matched flow table or group table entry. The packet_count and byte count are a part of the flow table entry's statistics. The packet_count is the number of the OpenFlow data packets that have matched a given flow entry in the flow table. The byte count stores the total byte count of the associated data packet. This data can be used for performing OAM functions.

Collecting OAM Packet Related Information

The protocol agent of each OpenFlow switch is be able to obtain the matched flow and group table entries and collect the associated metric information upon receiving an OAM packet from the OpenFlow switch module. To support the protocol agent, the OpenFlow switch module maintains a list of the matched flow table and group table entries with the associated metrics for all packets or some specific subset of the packets.

In one embodiment, the default operation of the OpenFlow switch module is to collect such matching metrics for all handled packets. However, this option results in additional administration and computation burden on the OpenFlow switch module. This behavior can be used for example in case of on-demand short term monitoring. In one embodiment, to alleviate this burden the OpenFlow switch module stores only the last few (e.g., 1, 2 or 3) matching flow table and/or group table entries together with the metrics. In this embodiment, whenever a new match entry is stored, the oldest match entry is discarded if the per packet match metric storage space is full. This process can be the used for example for proactive monitoring.

In another embodiment, to alleviate this computational and storage burden the OpenFlow switch module can collect the matching metrics only of distinguished or tagged packets (e.g., OAM packets). The amount of matched entries to maintain and the process for managing them can be configurable by the OAM module of the OpenFlow controller or similarly configurable.

When the protocol agent or similar component in the OpenFlow switch is the source of the packets, e.g., as a result of a trigger monitoring message, the OpenFlow switch module is able to determine or can be instructed by the protocol agent that the packet is an OAM packet and that matching metrics must be collected. When the OAM packet enters the OpenFlow switch through a physical port it is sent directly to the packet processing module. Then the OpenFlow switch module can identify the distinguished packets based on its configuration. In an example implementation, as described further herein above, a flow table entry can be formed to identify the distinguished packet and an instruction assigned to the flow table entry can instruct the OpenFlow switch module to start collecting the matching metrics. The drawback of this option is that there will not be any information on the matched entries prior to the reception of that instruction arriving at the OpenFlow switch module collecting the statistics. Prior configuration of the OpenFlow switch can be used to avoid this issue.

Figure 14:
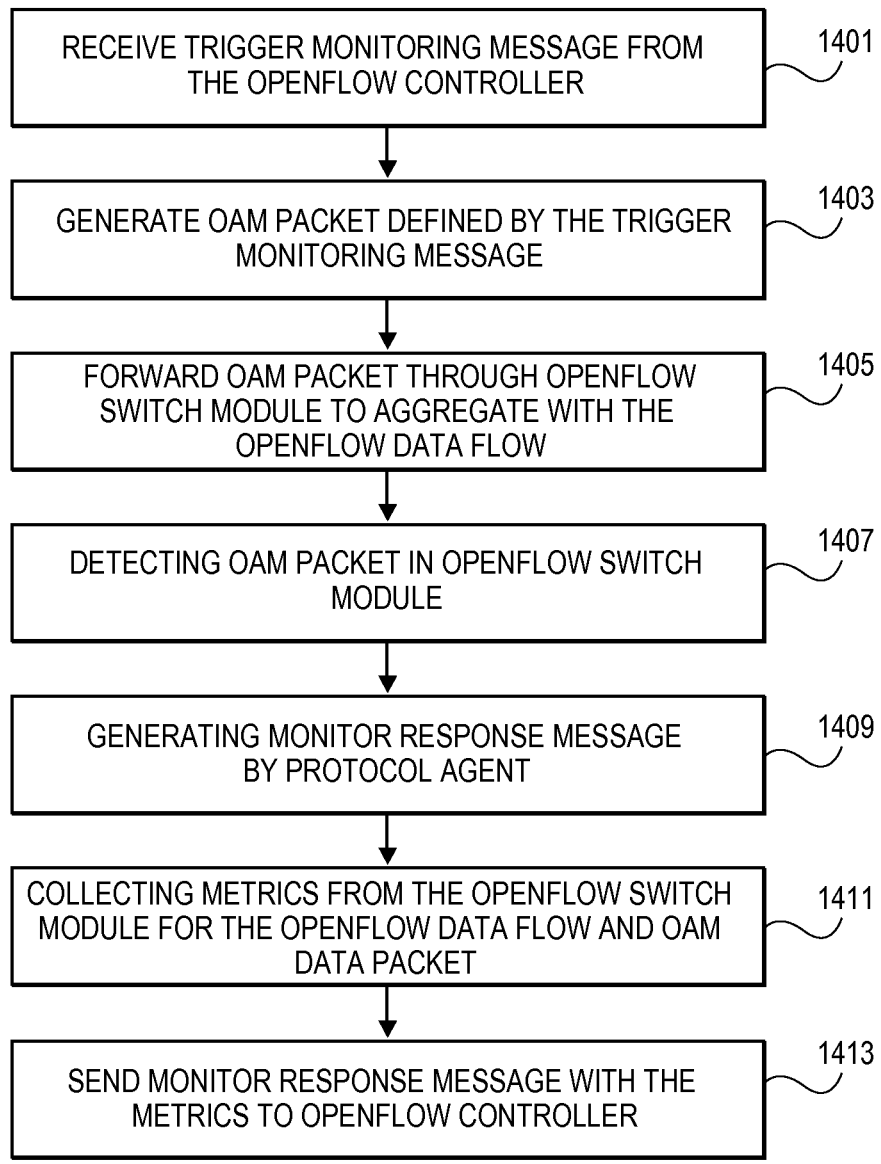
FIG. 14 is a flowchart of one embodiment of a process for OAM support at the OpenFlow switch.

FIG. 14 is a flowchart of one embodiment of a process for OAM support at the OpenFlow switch. The flowchart sets forth the flow of the OAM support in the OpenFlow switch. This process can be initiated in response to receiving the trigger monitoring message from the OpenFlow controller (Block 1401). The trigger monitoring messaged can be processed at the OpenFlow switch by the protocol agent or similar component of the OpenFlow switch to generate an OAM packet that is defined by the trigger monitoring message (Block 1403). The OAM packet may be provided within the trigger monitoring message, in which case it is extracted and inserted into the packet processing pipeline or forwarded to a port as directed by the trigger monitoring message (Block 1405). The insertion of the OAM packet into the packet processing pipeline in the OpenFlow switch module or forwarding to a port aggregates the OAM packet with the OpenFlow data flow to be monitored.

The OAM packet is matched with flow table and/or group table entries in the OpenFlow switch module (Block 1407). This causes corresponding counters to be incremented and match metric data to be recorded. After the OAM packet has traversed the OpenFlow switch module the protocol agent is notified and a monitor response message is generated by the protocol agent (Block 1409). The protocol agent collects (i.e., retrieves) the metrics and match data from the OpenFlow switch module for the OpenFlow data flow and/or the OAM data packet (Block 1411). This metric data is added to the monitor response message and sent to the OpenFlow controller (Block 1413). This metric information can then be used by the OpenFlow controller to execute an OAM function that was requested and that initiated the trigger monitoring message.

Implementation of OAM Features

Connectivity Verification

To verify connectivity, the OpenFlow controller can check if the OAM packets of the monitored OpenFlow data flow match on, and only on the desired flow table entries. For the connectivity verification OAM function, the matched flow table entries have to be identified both at the ingress and egress OpenFlow switches. This is solved by adding a reference for each matching table entry to the monitor response message sent to the OpenFlow controller from the OpenFlow switch as a result of monitoring for the OAM packet. This reference can be in the cookie field of the OpenFlow flow entry structure or the whole matching structure.

Once the response to the monitored OAM packet is available both from the ingress port and egress port of the respective OpenFlow switches to the OpenFlow controller, the OpenFlow controller can verify that the monitored packet matched exactly the desired flow table entries. These flow table entries are the same as matched flow table entries for the monitored OpenFlow data flow, the only difference may be the flow table entry identifying the monitored packet itself as the OAM packet. This function is unidirectional; to verify a bidirectional flow both directions have to be verified separately.

Link Trace

To provide link trace functionality, in addition to the connectivity verification functionality all intermediate OpenFlow switches are to be recorded as the OAM packet traverses these intermediate OpenFlow switches. The OpenFlow controller initiates the link trace by sending the appropriate OAM message to the ingress OpenFlow switch for the trace path. After forwarding of the OAM packet by the ingress OpenFlow switch, all intermediate OpenFlow switches will respond to the OpenFlow controller using a monitor response message by sending matched flow identifiers, while the egress OpenFlow switch will terminate the OAM packet by sending it to the OpenFlow controller also with the matched flow identifiers. This function is unidirectional; to verify a bidirectional flow both directions have to be verified separately.

Loss Measurement

For the loss measurement OAM function, the number of sent packets and received packets has to be known at the ingress OpenFlow switch and egress OpenFlow switch. The OpenFlow switch module counters for the flow table entries is each OpenFlow switch can be used to achieve the loss measurement. Instead of using only single counters at specific locations, the counters of all matching table entries are used while processing the OAM packet. For the loss measurement in addition to the flow entry identification, counters of the matched packets are also added to the data to be sent to the OpenFlow controller.

By using these counters from the ingress OpenFlow switch and the egress OpenFlow switch the OpenFlow controller can calculate the frame loss of an OpenFlow data flow. The loss is the number of the appropriate flow table entry matches counted at the ingress OpenFlow switch minus the appropriate flow table entry matching counted at the egress OpenFlow switch. The previous values of the loss can be subtracted from the current value to get the packet loss since the last measurement at the OAM module of the OpenFlow controller.

Depending on the implementation, the counters also count the measured OAM packets. However, since the OpenFlow controller initiates and terminates these messages, the loss value can be corrected to contain only the number of the lost OpenFlow data packets. This OAM function is unidirectional; to measure a bidirectional flow both directions have to be measured separately.

Delay Measurement

In one embodiment, at the ingress OpenFlow switch of the monitored OpenFlow data flow a time stamp is to be added to a delay measurement OAM packet. At the egress OpenFlow switch an additional time stamp is to be added to the delay measurement OAM packets. By using these time stamps, the OAM packet delay can be calculated by the OpenFlow controller. In one embodiment it is possible to add not only one time stamp, but each time stamp per matching flow table or group table entry throughout the OpenFlow switch module.

For the delay measurement, in addition to the flow entry identification, time stamps of the time of matching are added. By using these time stamps from the ingress OpenFlow switch and the egress OpenFlow switch the OpenFlow controller can calculate the frame delay of an OpenFlow data flow. This embodiment of the method, calculates the one way delay, which is meaningful if the clocks of the switches are synchronized. The round-trip delay eliminates shift of the clocks. In one embodiment, the round-trip delay of a bidirectional flow is calculated from the one-way delay of the two directions of a flow. This is implemented as the OpenFlow controller receives the delay measuring OAM frame from the first direction; it creates an additional measurement in the other direction. The calculation of the round-trip delay can be implemented as in ITU-T Y.1731, the only difference is that the processing time at the egress OpenFlow switch, which will be subtracted from the delay will include sending the OAM packet to the OpenFlow controller and receiving the OAM packet from the other direction.

Virtual MEPs and MIPs

As described in further detail above, maintenance end points (MEPs) or monitoring intermediate points (MIPs) have to be able to be placed at various places in the processing pipeline to support many types of OAM functions. In an example configuration, the data packets of different smaller OpenFlow data flows can be aggregated into a common larger flow. Then a flow entry will be defined for each smaller flow; the actions of these entries will instruct the updates of the packets to fit them into the new aggregated flow. A second flow entry deployed in a subsequent table will describe the common flow. MEPs could be placed on both the smaller flows and on the aggregated flow.

Instead of placing real MEPs on these observation points, the embodiments of the invention enable the placement of virtual MEPs, which are not really present in the OpenFlow switches; they exist only in the controller's logic. The packet processing pipeline is monitored and reported to the OpenFlow controller using these MEPs and MIPS so that the OAM functionality described above can be achieved. Considering the example configuration above, both types of OpenFlow data flows can be monitored by the OpenFlow controller, as the metrics information sent back to the OpenFlow controller contains the values for both of them.

The embodiments of the invention, describe an extension to the OpenFlow switch operation that allows the injection and de-multiplexing of certain data packets (tagged frames) into and/or from a data packet flow. Such configuration changes affect only the OpenFlow switches involved in the packet injection or removal processes and do not necessitate any configuration changes to any intermediate OpenFlow switches. Thus, in any intermediate OpenFlow node the same forwarding entry will be applied on both the regular data packets and the tagged frames. This feature ensures fate sharing for data packets inserted and monitored in a data flow.

The embodiments of the invention, enable easy and flexible deployment of OAM tools in an OpenFlow domain as they provide not only fate sharing for monitored data packets, but the embodiments also present mechanisms to forward the OAM packet to/from the monitoring points, regardless of whether the mechanisms are implemented at the OpenFlow switch or at the OpenFlow controller.

In addition, the embodiments of the invention implement an OAM toolset in an OpenFlow domain that does not depend on the type of the monitored data flow. This OAM toolset can be used for monitoring Ethernet, MPLS, IP, TCP and similar data flows. The OpenFlow OAM implementation is independent of any underlying technology and can be used to support or implement any of the technology specific OAM solutions, thereby avoiding the need for separate implementation of these OAM solutions. Since the processing of collected metric data from the OpenFlow switches is implemented in the OpenFlow controller, there is no need to deploy OAM functionality or physical monitoring points within the OpenFlow switches. Eliminating physical monitoring points at the OpenFlow switches provides several advantages. For example, there is no need for any configuration protocol extensions for deploying and configuring these monitoring points. Moreover, the configuration of such monitoring points can be quite complex, for instance requiring the specification of the flow entries to be evaluated to provide each OAM characteristic (e.g., packet loss). Thus, the embodiments of the invention simplify the implementation of OAM functionality at the OpenFlow switch thereby lowering the cost of these OpenFlow switches.

The embodiments of the invention include extensions to the OpenFlow switch, the OpenFlow controller and the OpenFlow protocol beyond that defined in OpenFlow 1.1. These extensions are backward compatible with OpenFlow 1.1. Only those OpenFlow switches that are to provide feedback to the OpenFlow controller must support the extensions, while the other switches can be standard switches according to the existing OpenFlow specification.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method performed by a network element implementing a controller for a split architecture network, the method to request that a subset of switches in the network report metrics for a data flow to provide a management module with information for executing a management function, the method comprising the steps of:
generating a trigger monitoring message by a management module, the trigger monitoring message defining actions to be performed by a switch in the subset of switches, wherein the actions are to provide the metrics for the data flow;
sending the trigger monitoring message to the switch;
receiving a plurality of monitor response messages from the subset of switches, each of the plurality of monitor response messages including a metric entry for each flow table or group table in which a match for the data flow occurred in a given switch, where each metric entry includes any one of a flow table identifier, a group identifier, a match structure, or a cookie of a flow entry;
correlating the plurality of monitor response messages with the management function;
executing the management function using the metrics of the data flow by the management module; and
generating a result of the management function.

2. The method of claim 1, wherein generating the trigger monitoring message further comprises the step of:
defining a management packet to be aggregated by the switch with the data flow.

3. The method of claim 1, wherein generating the trigger monitoring message further comprises the step of:
defining actions for a flow table or group table of a switch module in the switch.

4. The method of claim 1, wherein generating the trigger monitoring message further comprises the step of:
defining the metrics to be reported by a protocol agent of the switch.

5. The method of claim 1, wherein correlating the plurality of monitor response messages with the management function request, further comprises the step of:
matching the monitor response messages with the requested management function using a management packet within the monitor response messages.

6. A method performed by a network element implementing a switch, the switch to report metrics for a data flow to a controller of a split architecture network, wherein the switch forwards a management packet with the data flow and collects the metrics for the data flow, the method comprising the steps of:
receiving by the switch a trigger monitoring message from the controller;
generating the management packet by a protocol agent, the management packet defined by the trigger monitoring message;
forwarding the management packet through the switch module to aggregate the management packet with the data flow;
detecting the management packet in the switch module;
generating a monitoring response message by the protocol agent in response to the detecting of the management packet;
collecting the metrics from the switch module for the data flow and management packet; and
sending the monitor response message with the metrics to the controller, the monitor response message including a metric entry for each flow table or group table in which a match for the management packet occurred in the switch module, where each metric entry includes any one of a flow table identifier, a group identifier, a match structure, or a cookie of a flow entry.

7. The method of claim 6, further comprising the step of:
adding an action to a flow table or group table of the switch module defined in the trigger monitoring message.

8. The method of claim 6, further comprising the step of:
inserting the management packet into the monitoring response message by the protocol agent.

9. The method of claim 6, wherein collecting the metrics further comprises the step of:
reading a counter of a flow table entry or a counter of a group table entry; and
reading a time stamp of an execution of the flow table entry or the group table entry.

10. A network element implementing a controller, the controller to service a management function request in a network having a split architecture, the controller to request that a subset of switches in the network report metrics for a data flow to provide the information for executing the requested management function, the network element comprising:
a processor coupled to a management module and a message correlation module, the processor configured to execute the management module to execute a management function and to generate a trigger monitoring message, the trigger monitoring message defining actions to be performed by a switch in the subset of flow switches, wherein the actions are to provide the metrics for the data flow, wherein the processor is further configured to execute the management module to send the trigger monitoring message to the switch, to execute the management function using the metrics of the data flow provided by the message correlation module, and to generate a result of the management function, the message correlation module communicatively coupled to management module, the processor further configured to execute the message correlation module to receive a plurality of monitor response messages from the subset of switches, each of the plurality of monitor response messages including a metric entry for each flow table or group table in which a match for the data flow occurred in a given switch, where each metric entry includes any one of a flow table identifier, a group identifier, a match structure, or a cookie of a flow entry, wherein the processor is further configured to execute the message correlation module to correlate the plurality of monitor response messages with the management function request.

11. The network element of claim 10, wherein the processor is further configured to execute the management module to define a management packet to be forwarded by the switch with the data flow.

12. The network element of claim 10, wherein the processor is further configured to execute the management module to define actions for a flow table or group table of a switch module in the switch.

13. The network element of claim 10, wherein the processor is further configured to execute the management module to define the metrics to be reported by a protocol agent of the switch.

14. The network element of claim 10, wherein the processor is further configured to execute the management module to match the monitor response messages with the requested management function using an management packet within the monitor response messages.

\* \* \* \* \*